(12) United States Patent
Sato

(10) Patent No.: US 8,973,015 B2
(45) Date of Patent: Mar. 3, 2015

(54) INFORMATION PROCESSING DEVICE, SYSTEM, CONTROL METHOD, AND PROGRAM

(75) Inventor: Tadashi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/882,375

(22) PCT Filed: Nov. 1, 2011

(86) PCT No.: PCT/JP2011/075646
§ 371 (c)(1),
(2), (4) Date: Apr. 29, 2013

(87) PCT Pub. No.: WO2012/060465
PCT Pub. Date: May 10, 2012

(65) Prior Publication Data
US 2013/0219414 A1    Aug. 22, 2013

(30) Foreign Application Priority Data
Nov. 2, 2010  (JP) .................................. 2010-245766

(51) Int. Cl.
G06F 9/54    (2006.01)
G06F 13/00   (2006.01)

(52) U.S. Cl.
CPC ................. G06F 9/542 (2013.01); G06F 13/00 (2013.01)
USPC ............................. 719/318; 707/698; 707/700

(58) Field of Classification Search
CPC . H04L 63/1416; H04L 9/3236; H04L 9/3247; H04L 69/22; H04L 29/12047; H04L 29/12594; H04L 29/12801; H04L 61/6004; G06F 17/30303; G06F 21/6218; G06F 17/30911; G06F 17/3033
See application file for complete search history.

(56) References Cited

U.S. PATENT DOCUMENTS

2010/0332471 A1*  12/2010  Cypher ......................... 707/736
2011/0153953 A1*  6/2011   Khemani et al. ............... 711/136

FOREIGN PATENT DOCUMENTS

| JP | 2007-156700 A | 6/2007 |
|---|---|---|
| JP | 2009-20757 A  | 1/2009 |
| JP | 2009-295127 A | 12/2009 |

OTHER PUBLICATIONS

Ashwin R. Bharambe, Sanjay Rao and Srinivasan Seshan, "Mercury: A Scalable Publish-Subscribe System for Internet Games", Proc. of 1st Workshop on Network and System Support for Games (NetGames2002), Apr. 2002. pp. 3-9.

(Continued)

*Primary Examiner* — Tuan Dao
(74) *Attorney, Agent, or Firm* — Sughrue Mion, PLLC

(57) ABSTRACT

An information processing device reduces a time of processing for adding an attribute name performed in each node. The device memorizes its own segment. This segment is at least one segment among each segment made by dividing a range of a key into a plurality of segments, so as to make the segments neighbor with each other. The key is generated about at least two attribute names using an attribute name and an attribute value based on a specified order relation and is of size-comparable form. The device judges whether a key generated from an attribute name and an attribute value is included in its own segment or not.

9 Claims, 23 Drawing Sheets

(56) References Cited

OTHER PUBLICATIONS

Ashwin R. Bharambe, Mukesh Agrawal, Srinivasan Seshan, "Mercury: Supporting Scalable Multi-attribute Range Queries," ACM SIGCOMM Computer Communication Review, vol. 34 No. 4, Oct. 2004, pp. 353-366.

International Search Report of PCT Application No. PCT/JP2011/075646 mailed on Mar. 6, 2012.

* cited by examiner

FIG.5

| ATTRIBUTE NAME | RANGE OF VALUE WHICH ATTRIBUTE VALUE CAN TAKE | DESIGNATED RANGE OF ATTRIBUTE VALUE | PROPORTION |
| --- | --- | --- | --- |
| x | INTEGER INCLUDED IN [1, 100] | [11, 20] | 1/10 |
| y | INTEGER INCLUDED IN [1, 300] | [11, 60] | 1/6 |

FIG.12

| SUBSCRIPTION ID | SUBSCRIPTION |
|---|---|
| "sub1" | ($50 \leq x \leq 150$ & $150 \leq y \leq 250$, app1) |
| .. | .. |

INFORMATION PROCESSING DEVICE, SYSTEM, CONTROL METHOD, AND PROGRAM

This application is a National Stage Entry of PCT/JP2011/075646 filed Nov. 1, 2011, which claims priority from Japanese Patent Application 2010-245766 filed Nov. 2, 2010, the contents of all of which are incorporated herein by reference, in their entirety.

TECHNICAL FIELD

The present invention relates to an information processing device, a system, a control method and a program.

BACKGROUND ART

There is an event distribution system which can deliver data including no smaller than one data item such as an ID, a position and clock time (hereinafter, such data is referred to as "event") to an application. Each data item includes an attribute name and an attribute value. For example, when an event is generated based on a temperature of 20° C. and a humidity of 60% observed by a temperature and humidity sensors, the event can be expressed as it is formed by a data item having an attribute name "temperature" and an attribute value of 20° C. to that and a data item having an attribute name "humidity" and an attribute value of 60% to that.

A subscription, a subscription ID for identifying the subscription and a request type for distinguishing between a registration request and a deletion request are inputted (subscribed) from an external program (subscriber) to an event distribution system. A subscription includes a condition of an event (event condition) and the ID of an application of a notification destination (application ID). In the case where a request type is a registration request, a subscription ID and a subscription are stored in the event distribution system as a pair. An event distribution system can describe a plurality of attribute conditions as an event condition. For example, an event distribution system can designate an attribute name and a range of an attribute value to that as an attribute condition.

When an event occurs in an external program (publisher), the event is inputted (published) to an event distribution system. When the inputted event meets the event condition of a registered subscription, the event distribution system transmits the event to an application which is specified by an application ID designated along with the event condition as a pair.

Here, it is the that an event meets an event condition when, about every attribute condition constituting the event condition, the event includes an attribute name designated by the attribute condition concerned and an attribute value range designated by the attribute condition includes the attribute value to the attribute name described in the event. For example, it is supposed that an event condition having an attribute name "temperature" and a range of an attribute value of "10° C. or more, and 30° C. or less" to the attribute name has been registered with an event distribution system. It is supposed that, in this state, an event including an attribute having an attribute name "temperature" and an attribute value of "20° C." to that and an attribute having the attribute name "humidity" and an attribute value of "60%" to that has occurred. About the attribute name "temperature", it can be the that the event meets the event condition because "20° C." is included in "10° C. or more, and 30° C. or less" designated by the event condition. About the attribute name "humidity", it does not have an influence on whether the event condition is met or not because is not designated by the event condition.

A technological example which handles an event thus is disclosed in non-patent literature 1. FIG. 19 is a diagram illustrating a technology disclosed in non-patent literature 1. An event (Publication in FIG. 19) and an event condition (Subscription in FIG. 19) shown in FIG. 19 include an attribute name x and an attribute name y. It is described in the event that an attribute value to the attribute name x is 100, and an attribute value to the attribute name y is 200. It is described in the event condition that the range of an attribute value to the attribute name x is not less than 50 and not more than 150, and the range of an attribute value to the attribute name y is not less than 150 and not more than 250. The event meets the event condition. The system shown in FIG. 19 includes a subsystems (hubs) corresponding to each attribute name on one-on-one basis. A hub is connected to not less than one node in a ring shape. The next node on a ring seen from a certain node is called a successor. The prior node on a ring seen from a certain nod is called a predecessor. A node belonging to a hub manages a range of an attribute value (attribute value range) to an attribute name corresponding to the hub.

A node which has received a subscription from a sub scriber or has received an event from a publisher transmits the event or the subscription to a node belonging to a hub different from the hub to which the former node belongs. Therefore, a node holds a network address of a node belonging to a hub different from a hub to which the former node belongs (such node is referred to as a "cross hub adjacent node"). A method to determine a cross hub adjacent node is disclosed in non-patent literature 2.

Immediately after a new node has participated in a hub, a system makes the cross hub adjacent node of the successor of the node be a cross hub adjacent node link of the node. The system begins a maintenance process after that. In the maintenance process, the system performs a random walk in each of the other hubs and determines a new cross hub adjacent node. A random walk means that a node which begins the random walk accesses an optional node recorded in a routing table (hop), the accessed node performs a further hop by the same way as the above, and such hop is repeated until a specified hop count is reached. Then, the system determines a node which is reached at the time when the specified hop count has been reached as a cross hub adjacent node.

CITATION LIST

Non Patent Literature

[Non-patent Literature 1] Ashwin R. Bharambe, Sanjay Rao and Srinivasan Seshan: "Mercury: A Scalable Publish-Subscribe System for Internet Games", Proc. of 1st Workshop on Network and System Support for Games (NetGames2002), April, 2002.

[Non-patent Literature 2] Ashwin R. Bharambe, Mukesh Agrawal, Srinivasan Seshan, "Mercury: Supporting Scalable Multi-attribute Range Queries," ACM SIGCOMM Computer Communication Review, Vol. 34 No. 4, October, 2004.

SUMMARY OF INVENTION

Technical Problem

Although the method disclosed in non-patent literatures 1 and 2 is effective for a data item of a attribute name set in advance, it is not effective in a situation that an attribute name which has not been set in advance is added newly. That is, in the method disclosed in non-patent literatures 1 and 2, an infinite number of hubs are needed when hubs for all unknown attribute names are tried to be produced in advance, but it is impossible. It is also conceivable that a system generates a node corresponding to a new attribute name at the timing when the attribute name is added, and makes the node be a hub for the attribute name. However, the system is required to establish a link between a node generated newly and all nodes constituting other existing hubs. Accordingly, there is a problem that, at the time of adding an attribute name, it takes time for such system to perform processing in each node for adding the attribute name.

Therefore, an object of the present invention is to provide an information processing device, a system, a control method and a program which reduce a time of processing for adding an attribute name performed in each node in order to settle the above-mentioned problem.

Solution Problem

One exemplary embodiment of the present invention is an information processing device, comprising: its own-segment memorizing means for memorizing its own segment, the own segment being at least one segment among each segment made by dividing a range of a key into a plurality of segments so as to make the segments neighbor with each other, the key being generated about at least two attribute names using an attribute name and an attribute value based on a specified order relation and being of a size-comparable form; and a judgment means for judging whether a key generated from an attribute name and an attribute value being included in the own-segment or not.

According to the present invention, there is provided an information processing program that makes an information processing device, which comprises its own-segment memorizing means for memorizing its own segment, the own segment being at least one segment among each segment made by dividing a range of a key into a plurality of segments so as to make the segments neighbor with each other, the key being generated about at least two attribute names using an attribute name and an attribute value based on a specified order relation and being of a size-comparable form, carry out a judgment step of determining whether a key generated from an attribute name and an attribute value being included in the own-segment or not.

Also, according to the present invention, there is provided information processing method for making an information processing device which comprises its own-segment memorizing means for memorizing the own segment, the own segment being at least one segment among each segment made by dividing a range of a key into a plurality of segments so as to make the segments neighbor with each other, the key being generated about at least two attribute names using an attribute name and an attribute value based on a specified order relation and being of a size-comparable form, carry out judgment for judging whether a key generated from an attribute name and an attribute value is included in its own segment or not.

Advantageous Effects of the Invention

According to the present invention mentioned above, an information processing device, a system, a control method and a program which reduce a time of processing for adding an attribute name performed in each node can be provided.

BRIEF DESCRIPTION OF THE DRAWINGS

FIG. 5 is a diagram according to the first exemplary embodiment of the present invention showing an example of relation between: a range from a lower limit value to an upper limit value which can be taken by an attribute value; a range of an attribute value designated by an event condition; and a proportion of the range of the attribute value occupied in the range from the lower limit value to the upper limit value.

FIG. 12 is a diagram showing an example of a subscription management table according to the first exemplary embodiment of the present invention.

DESCRIPTION OF EMBODIMENTS

Hereinafter, exemplary embodiments of the present invention will be described using drawings. In all drawings, a same code is attached to a same component, and description will be omitted appropriately.

Meanwhile, each part of which a disk apparatus or the like of each exemplary embodiment is composed, includes a control unit, a memory, a program loaded in the memory, a storage unit such as a hard disk for storing a program, an interface for a network connection and the like, and is realized by an optional combination of hardware and software. Unless otherwise noted, its realization method and device are not limited.

Also, a control unit consists of a CPU (Central Processing Unit) and the like, operates an operating system to control the whole of a disk apparatus or the like, reads a program and data from a recording medium loaded on a drive apparatus, for example, to a memory, and carries out various kinds of processing according to the program and data.

A recording medium is an optical disc, a flexible disc, a magneto optic disc, an external hard disk, a semiconductor memory or the like, for example, and stores a computer program in a form readable by a computer. A computer program may be downloaded from an outside computer (not shown) connected to a communication network. Here, unless otherwise noted, a communication network may be the internet, a LAN (Local Area Network), a public line network, a wireless communication network, or a network or the like configured by a combination and the like of them.

A block diagram used in description of each exemplary embodiment indicates a structure of a function-unit basis, not a structure of a hardware-unit. These function blocks are realized by an optional combination of hardware and software. In addition, in these drawings, although there is a case where a component of each exemplary embodiment is described such that it is realized by one device combined physically, its realization means is not limited to this. That is, a component, a device, a system and the like described in each exemplary embodiment may be realized by a plurality of devices by connecting two or more devices separated physically by a wired or a wireless line. Also, although there is a case where each component is described as two or more physically separated devices, its realization means is not limited to this. That is, each component, a device, a system or the like of each exemplary embodiment may be realized by combining hardware and software optionally so that it may be realized by one physically combined device.

The First Exemplary Embodiment

Figure 1:
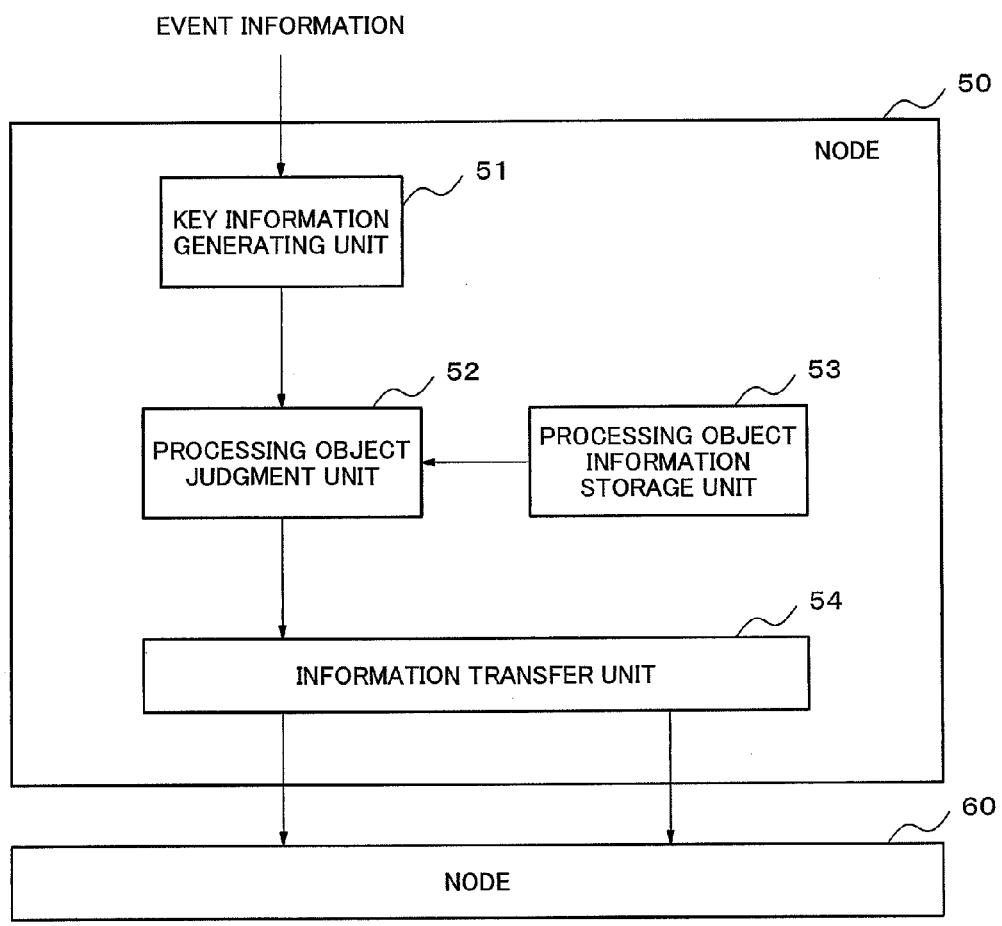
FIG. 1 is a block diagram of an information processing device 5 according to a first exemplary embodiment of the present invention.

First, the outline of the event distribution system 1 according to the first exemplary embodiment of the present invention will be described with reference to FIG. 1. FIG. 1 is an outline of a block diagram of an information processing device 5 forming the event distribution system 1 according to this exemplary embodiment.

The information processing device 5 may include a plurality of node 50 and node 60. Or, the node 50 and node 60 may be formed by the information processing device 5 or part of it. In other words, one node may be formed by one information processing device 5, or one node may be formed by assigning an optional amount of a resource such as a memory, a CPU (Central Processing Unit) and a hard disk included in the information processing device 5. A plurality of nodes may be formed by one information processing device 5.

The node 50 includes a key information generating unit 51, a processing object judgment unit 52, a processing object information storage unit 53 and an information transfer unit 54. Meanwhile, description about a structure of the node 60 will be omitted because it is similar to the structure of the node 50.

The nodes 50 and 60 receive event information including an attribute name which indicates a type of information and an attribute value which indicates a value of the information. Here, event information (also referred to as an event) is data including no smaller than one data item such as an ID, a position and clock time as mentioned above. A data item includes an attribute name and an attribute value. For example, when an event is generated based on a temperature of 20° C. and a humidity of 60% observed by temperature and humidity sensors, the event can be expressed as it is formed by a data item having an attribute name of "temperature" and an attribute value of 20° C. to that and a data item having an attribute name of "humidity" and an attribute value of 60% to that. An attribute name is a name attached to a data item. An attribute name is a property or a feature that is possessed by a certain object generally, and for example, it may be one that represents an optional property or feature of the color, the shape, the position, the time and the like of the object in addition to the temperature and the humidity mentioned above, but not limited to these particularly. An attribute value represents a value which can be taken by an attribute expressed in an attribute name. For example, in the above-mentioned example, an attribute value to the attribute name "temperature" is "60%" or the like.

The nodes 50 and 60 make event information including a specified attribute name and an attribute value within a specified range among received event information be a processing object.

When event information is received, the key information generating unit 51 generates key information, which is made by converting an attribute name and an attribute value into a size-comparable form, from the attribute name and the attribute value included in the event information. Then, the key information generating unit 51 outputs the event information and key information generated from the event information to the processing object judgment unit 52.

When the event information and the key information outputted from the key information generating unit 51 is acquired, the processing object judgment unit 52 acquires processing object information stored in the processing object information storage unit 53. The processing object judgment unit 52 determines whether to make the acquired event information be a processing object or not by comparing the acquired key information and the processing object information.

The processing object information storage unit 53 holds processing object information which indicates key information on a specified attribute name and an attribute value within a specified range in advance.

When the processing object judgment unit 52 determines that the event information is not handled as a processing object, the information transfer unit 54 transmits the event information and the key information generated from the event information to another node.

Figure 2:
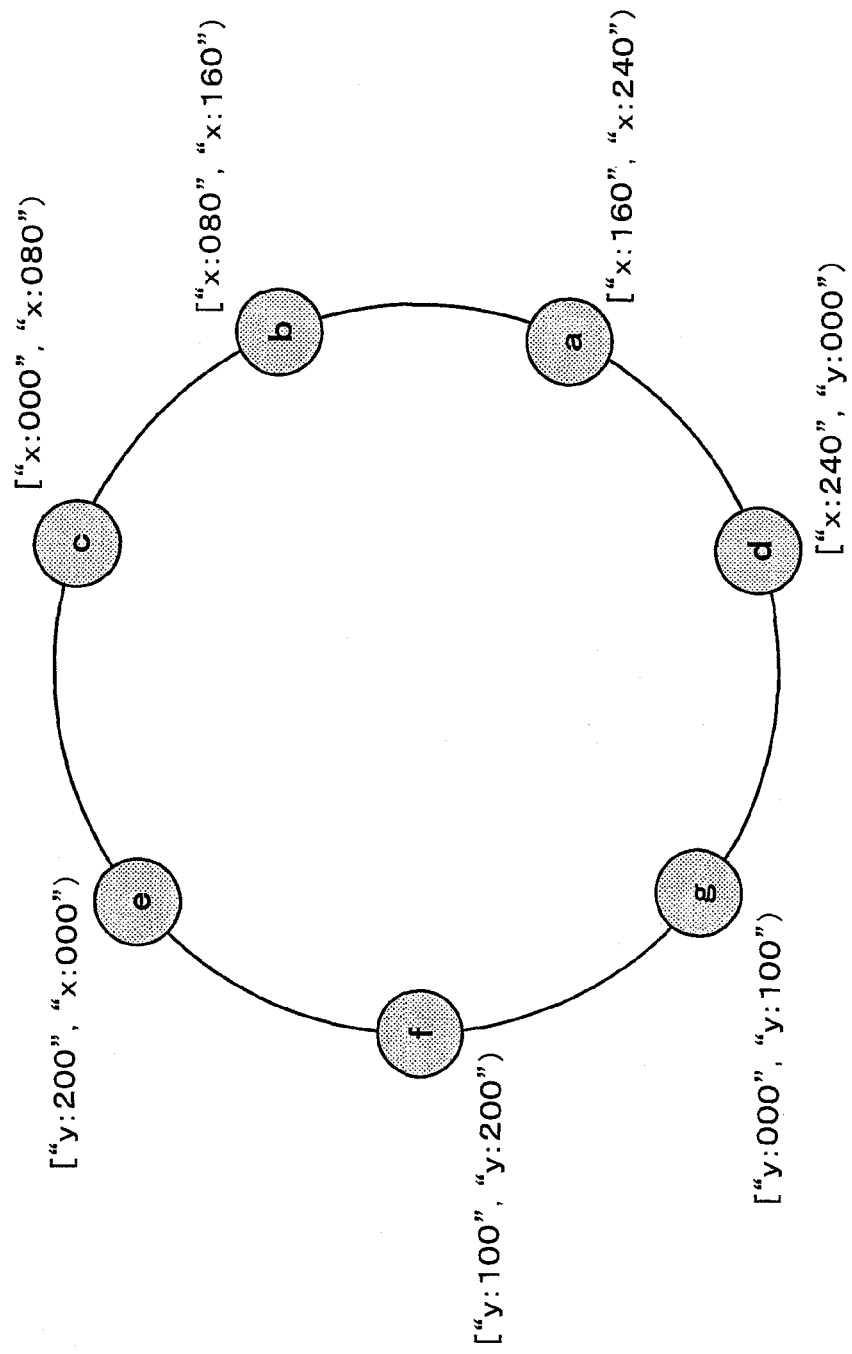
FIG. 2 is a block diagram of an event distribution system 1 according to the first exemplary embodiment of the present invention.

Next, the event distribution system 1 according to this exemplary embodiment will be described in detail. A configuration of the event distribution system 1 according to this exemplary embodiment will be described with reference to FIG. 2. FIG. 2 is a block diagram of the event distribution system 1.

The event distribution system 1 includes not less than one node. The event distribution system 1 manages a space (set) of a value (key) decided uniquely from a data item. Order is defined between different keys. Each node manages a continuous range of a key.

In this exemplary embodiment, the information processing device 5 prepares a key generating function which generates a key made by converting an attribute name and an attribute value which are included in an event and a subscription into a size-comparable form. In other words, a key generating function is a function that makes a key be a return value. It is assumed that an attribute name is n (n is a character string or the like), an attribute value is v (v is a character string, a real number or the like), and a key generating function which generates a key is represented by f(n, v). Here, it is supposed that order is defined for an attribute name and an attribute value, respectively. For example, a magnitude correlation is defined for attribute names. For example, when an attribute name is expressed in a character string and order relation is based on the lexicographic order, an attribute name "temperature" will be a value smaller than that of an attribute name "clock time". The function f(n, v) is a function that fills f(n1,v1)>f(n2,v2) when n1>n2. However, v1 and v2 are optional values. Further, f(n,v) is a function that fills f(n1, v1)>f(n2, v2) when n1=n2 and v1>v2. Description of details of order of an attribute name will be made later.

An example of a key generating function (described as f1(n, v)) will be shown. It is supposed that an attribute name is expressed in a character string. An attribute value is supposed to be expressed in a decimal integer of up to 3 digits (from 0 to 999). First, f1(n, v) converts an attribute value into a character string. For example, in the case where an attribute value is a value from 0 to 99, f1(n, v) adds 0 to a high order digit to make it be three characters. For example, an attribute value 20 becomes a character string "020" after the conversion. After that, the function f1(n, v) combines the character string of the attribute name and the character string of the attribute value in a manner sandwiching a delimiter between them, and makes it a return value of f1(n, v). As a delimiter, f1(n, v) uses a symbol that is used for neither of an attribute name nor an attribute value. For example, when the delimiter is ":", f1(n, v) will be f1("x", 20)="x:020".

The event distribution system 1 assigns many nodes to hash values generated from the attribute name "x" and "y" in the example of FIG. 2. In the case where an attribute name designated by an event condition is one of "x" and "y", or both of them, such arrangement of hash values is appropriate. When a condition of an attribute name "z" is designated as an event condition, the event condition is arranged in a node e as mentioned later. When a lot of event conditions in which a condition of the attribute name "z" is designated are registered, it is possible for the event distribution system 1 to balance the event processing load by assigning more nodes to hash values generated from the attribute name "z".

Another example of the key generating function (described as f2(n, v)) will be indicated. In an information processing device such as a PC (Personal computer) or a server and the like, a character string obtained by f1(n, v) is expressed by a character code as a bit string. The function f2(n, v) makes a specified number of bits from the high order of a bit string which expresses a character string obtained by f1(n, v) by character codes be a return value. For example, f2(n, v) makes 160 bits of high order of the bit string be a return value of f2. In this case, because "x:020" will be 160 bits (four bytes×five characters×8) when a character code is of four bytes, the entire bit string which expresses "x:020" by a character code will be a return value.

In this exemplary embodiment, the event distribution system 1 is illustrated about a case where seven nodes from a node a to a node g exist. It may be supposed that each attribute value has a lower limit value (or, a minimum value, and the same shall apply hereinafter) and an upper limit value (or, a maximum value, and the same shall apply hereinafter) in the event distribution system 1. Regarding a range that an attribute value can take, the event distribution system 1 can be made be a system that supports two attribute names of the attribute name "x" which is an integer of no smaller than 0 and less than 320 and the attribute name "y" for which a range of an attribute value which can be taken is an integer of no smaller than 0 and less than 320, for example. Order relation of character strings may be set in what way. For example, order relation of character strings may be ":"<"0"<"1"< . . . <"9"<"a"<"b"< . . . <"z". Hereinafter, in this exemplary embodiment, order of attribute names is assumed to circulate as follows. That is, in an example of attribute name of an alphabet, order of characters circulates through as "a"<"b"< . . . "x"<"y"<"z"<"a"<"b"< . . . (such relation is referred to as cyclic order relation). For example, the node a shown in FIG. 2 manages a key range of no smaller than "x:160" and smaller than "x:240" (this is represented as ["x:160", "x:240").) For example, the node a manages a key "x:200". The node e manages the range of a key no smaller than "y:200" and a key smaller than "x:000", that is, attribute names "z", "a", "b" . . . , "w" before x and attribute values corresponding to the attribute names. Accordingly, the node e manages a key "z:050", for example. In other words, a node in this exemplary embodiment manages a range less than one round in cyclic order relation that attribute names have.

Figure 3:
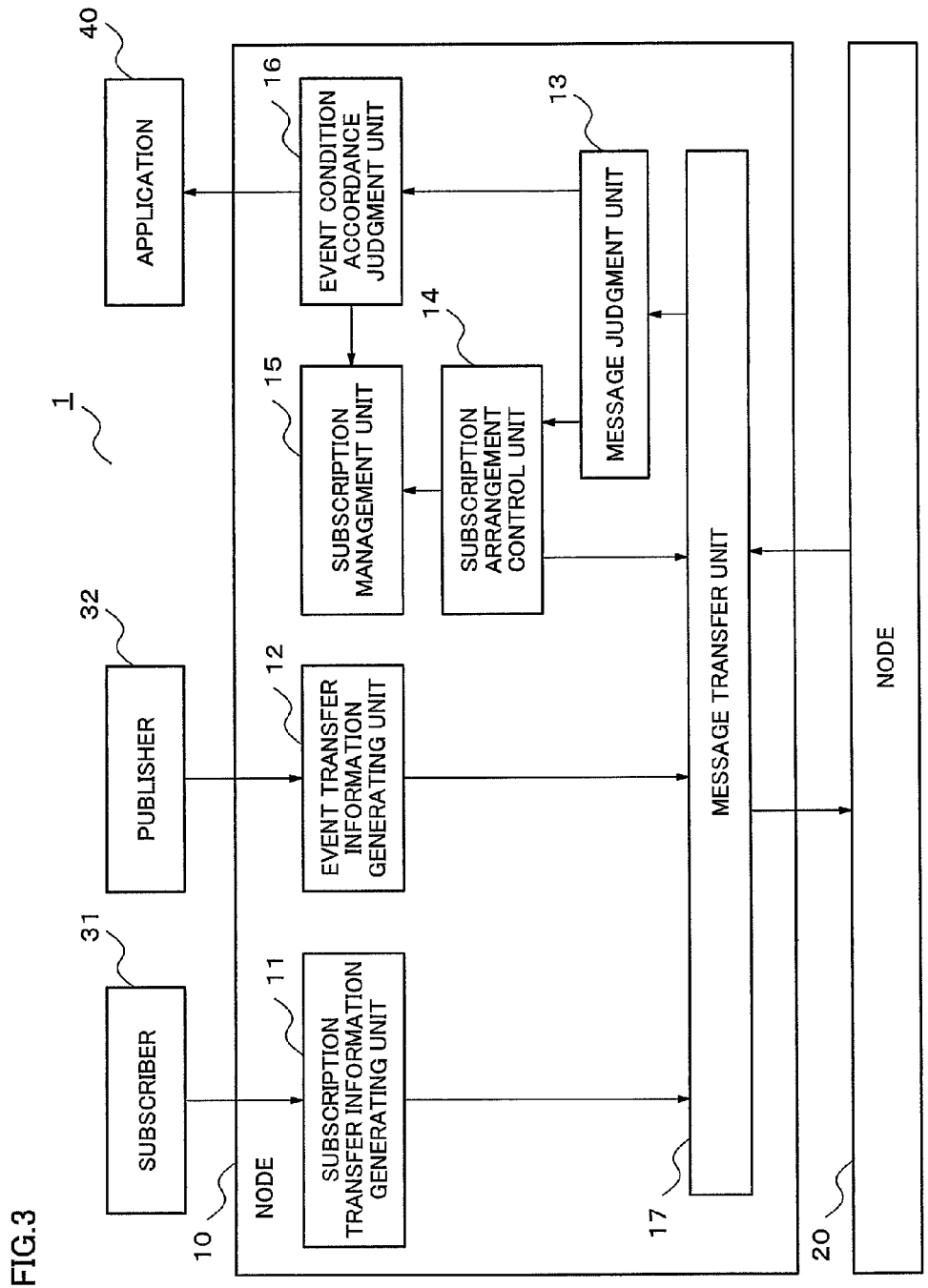
FIG. 3 is a block diagram of a node according to the first exemplary embodiment of the present invention.

Next, a specific configuration of a node according to this exemplary embodiment will be described. FIG. 3 is a specific block diagram of a node described in FIG. 1.

A node 10 has a subscription transfer information generating unit 11, an event transfer information generating unit 12, a message judgment unit 13, a subscription arrangement control unit 14, a subscription management unit 15, an event condition accordance judgment unit 16 and a message transfer unit 17. Meanwhile, description about a structure of the node 20 will be omitted because it is similar to the structure of the node 10. In other words, the structure of the nodes a-g included in the event distribution system 1 is similar to that of the node 10.

From a subscription inputted from a sub scriber 31, the subscription transfer information generating unit 11 generates information needed to transmit the subscription. A subscription includes an event condition and the ID of an application (application ID) of a notification destination (refer to FIG. 12). An event condition is a condition of an event including a plurality of attribute conditions (an attribute name and a range of an attribute value to that).

The event transfer information generating unit 12 generates, from an event inputted from a publisher 32, information required to transmit the event. A key is included in information which the subscription transfer information generating unit 11 and the event transfer information generating unit 12 generate.

The subscription transfer information generating unit 11 and the event transfer information generating unit 12 function as the key information generating unit 51 shown in FIG. 1.

The message judgment unit 13 determines whether a message sent to the node 10 is a subscription or an event. A subscription inputted from the subscriber 31, an event inputted from the publisher 32, or a subscription ID, a request type, an attribute name and the like are transmitted to the node 10 from the other node 20. Accordingly, such information such as subscriptions and events transmitted from the other node 20 (or, transmitted to the other node 10) is called a message collectively.

The subscription arrangement control unit 14 determines to which node a subscription is allocated.

The subscription management unit 15 stores the subscription in the node. The subscription management unit 15 corresponds to the processing object information storage unit 53 shown in FIG. 1.

The event condition accordance judgment unit 16 determines whether a received event meets an event condition which is included in a subscription stored in the subscription management unit 15.

The message transfer unit 17 transmits a message including an event or a message including a subscription ID, a subscription and a request type (a type for distinguishing a registration request and a deletion request) to a node of a forwarding destination determined by an inputted key. The message transfer unit 17 functions as the processing object judgment unit 52 and the information transfer unit 54 shown in FIG. 1.

Figure 4:
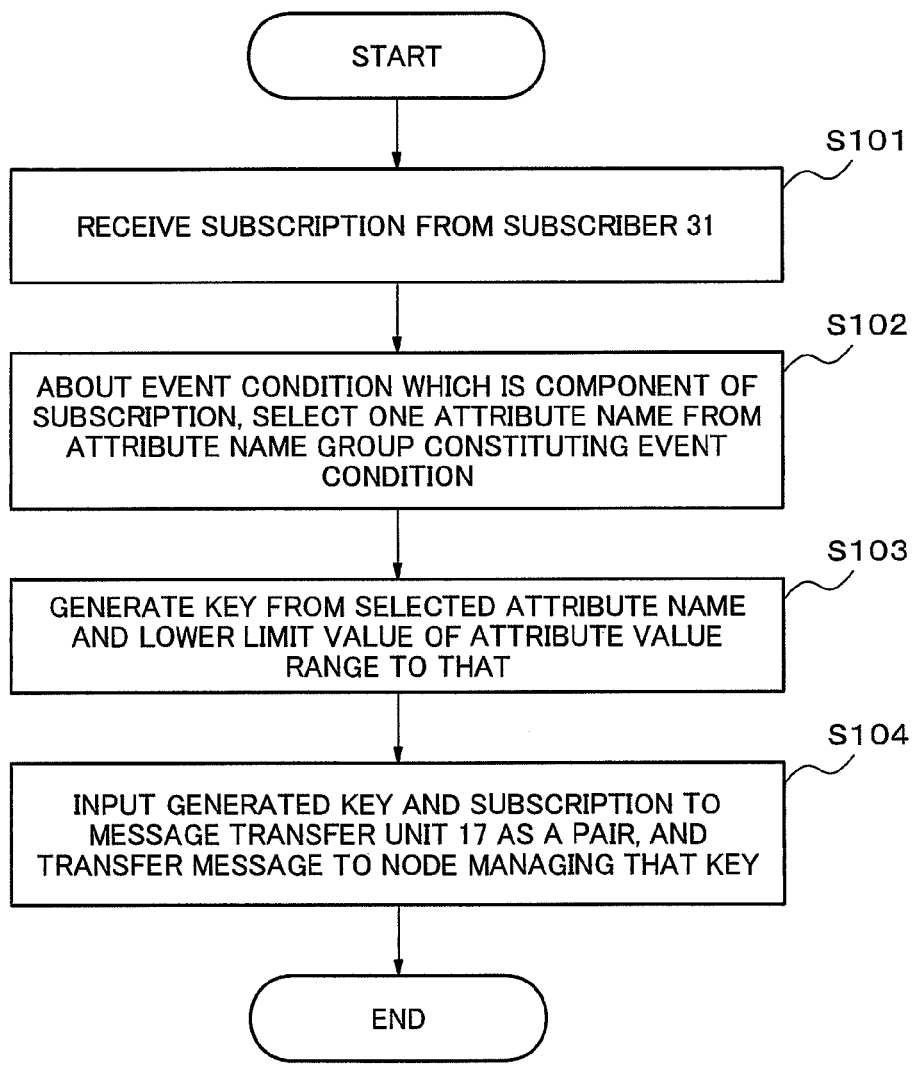
FIG. 4 is a flow chart showing operations in a subscription transfer information generating unit 11 according to the first exemplary embodiment of the present invention.

Next, with reference to FIG. 4, operations in the subscription transfer information generating unit 11 according to this exemplary embodiment will be described. FIG. 4 is a flow chart showing operations in the subscription transfer information generating unit 11.

When a subscription is inputted from the subscriber 31 to the node 10, the inputted subscription is processed by the subscription transfer information generating unit 11, first (S101). About an event condition which is a component of the received subscription, the subscription transfer information generating unit 11 selects one attribute name from the attribute name group constituting the event condition (S102). Next, the subscription transfer information generating unit 11 generates a key from the selected attribute name and the lower limit value of an attribute value range to that (S103). Finally, the subscription transfer information generating unit 11 inputs the generated key and the subscription to the message transfer unit 17 as a pair. As a result, a message including the subscription is transmitted to a node which manages the key.

As a method for the subscription transfer information generating unit 11 to select one attribute name from an attribute name group constituting an event condition, there is the following method, for example. The subscription transfer information generating unit 11 may find, about each attribute name constituting an event condition, a proportion of an attribute value range which is designated as an event condition to a range of a value which can be taken as an attribute value, and select an attribute name having the smallest proportion, for example. FIG. 5 indicates a relation example of a range from a lower limit value to an upper limit value which an attribute value can take, a range of an attribute value designated by an event condition and a proportion of the range of the attribute value to the range from the lower limit value to the upper limit value. For example, supposing that the number of values which an attribute value to an attribute name "x" can take is 100, and the size of an attribute value range designated by an event condition is 10, the proportion of them will be 1/10. Also, for example, supposing that the number of values which an attribute value to an attribute name "y" can take is 300, and the size of an attribute value range designated by an event condition is 50, the proportion will be 1/6. Therefore, in case of this example, the subscription transfer information generating unit 11 selects the attribute name "x" having the smaller proportion. Then, the subscription transfer information generating unit 11 generates a key from the attribute name "x" and an attribute value "11" which is the lower limit value of the attribute value range corresponding to that. The subscription transfer information generating unit 11 may generate a key using a value besides the lower limit value of an attribute value range. The subscription transfer information generating unit 11 uses the key generating function mentioned above for generating a key from an attribute name and an attribute value.

Here, when there is an overlap between: the attribute name and the range of the attribute value included in the event condition of the subscription; and the attribute name and the range of the attribute value which the node manages, the subscription is registered with the node. Accordingly, as mentioned above, when the subscription transfer information generating unit 11 selects an attribute name having the smallest proportion of an attribute value range which is designated as an event condition to a range of values which can be taken as an attribute value, the number of nodes with which a subscription is registered can be reduced.

Figure 6:
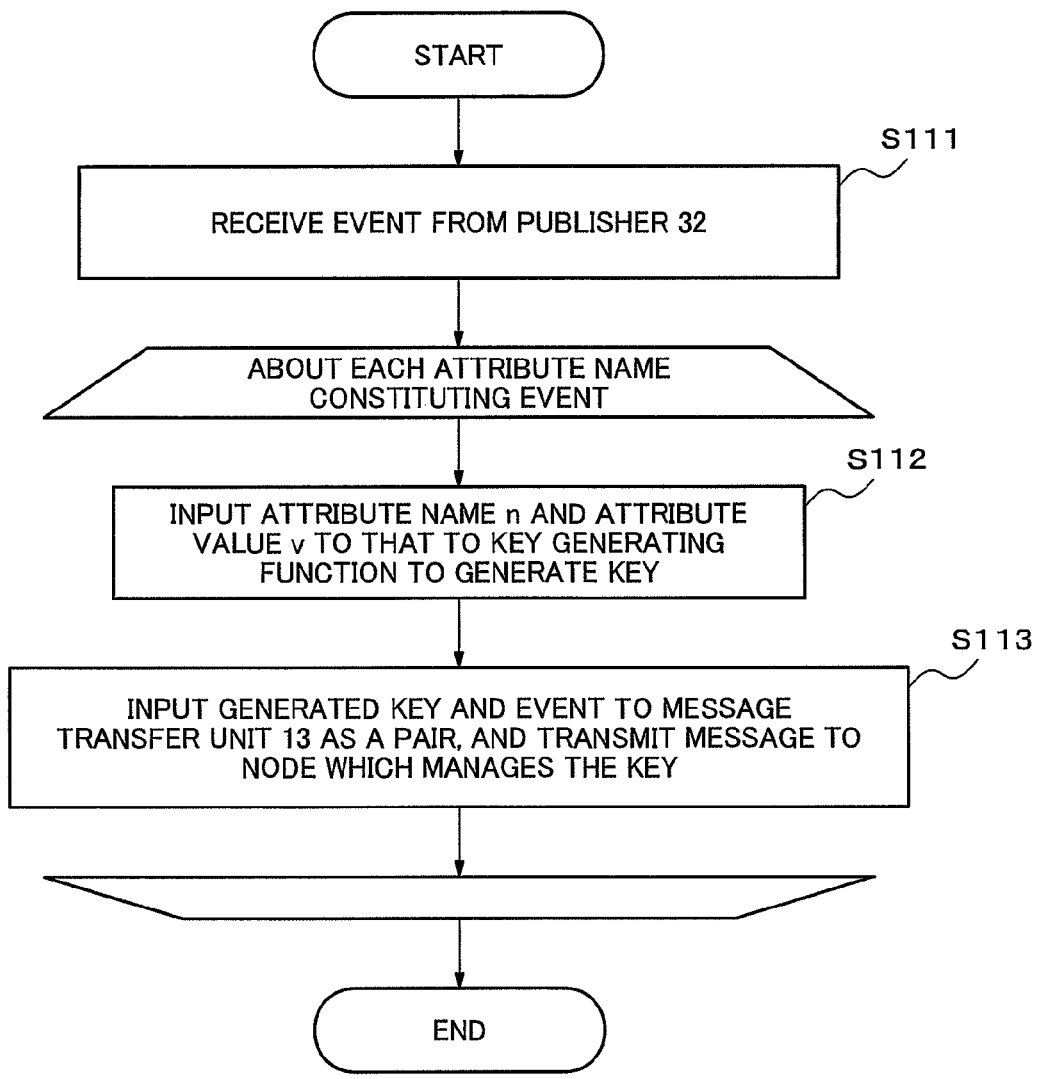
FIG. 6 is a flow chart showing operations in an event transfer information generating unit 12 according to the first exemplary embodiment of the present invention.

Next, operations in the event transfer information generating unit 12 according to this exemplary embodiment will be described with reference to FIG. 6. FIG. 6 is a flow chart showing operations of the event transfer information generating unit 12.

First, an event inputted from the publisher 32 is processed by the event transfer information generating unit 12 (S111). The event transfer information generating unit 12 performs the following processing about each attribute name constituting the received event. First, the event transfer information generating unit 12 inputs an attribute name n and an attribute value v to that to a key generating function and generates a key (S112). Next, the event transfer information generating unit 12 inputs the generated key and the event to the message transfer unit 17 as a pair, and transmits a message to a node which manages the key (S113).

Figure 7:
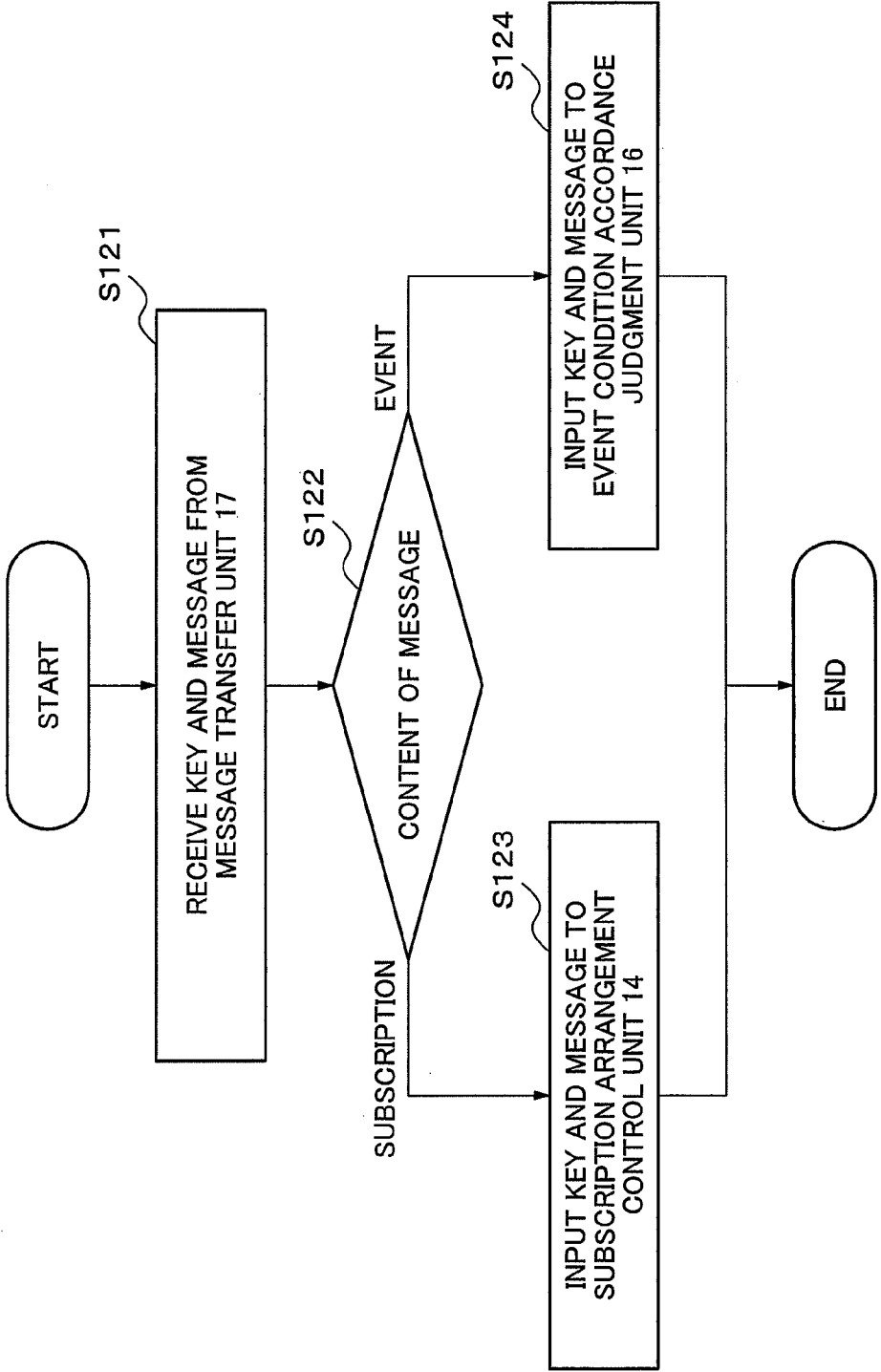
FIG. 7 is a flow chart showing operations in a message judgment unit 13 according to the first exemplary embodiment of the present invention.

Next, operations in the message judgment unit 13 according to this exemplary embodiment will be described with reference to FIG. 7. FIG. 7 is a flow chart showing operations of the message judgment unit 13.

The message judgment unit 13 receives a key and a message from the message transfer unit 17 (S121). The message judgment unit 13 judges the content of the received message (S122). When the message is a subscription, the message judgment unit 13 inputs the key and the message to the subscription arrangement control unit 14 and ends processing (S123). On the other hand, when a message is an event, the message judgment unit 13 input the key and the message to the event condition accordance judgment unit 16, and ends processing (S124).

Figure 8:
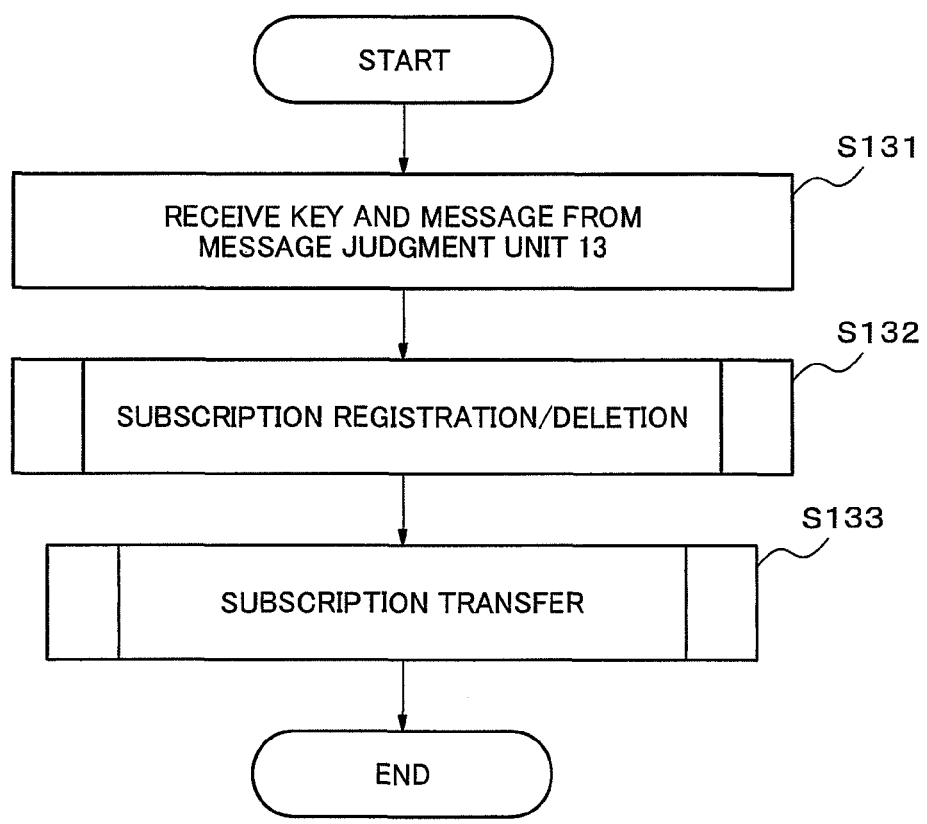
FIG. 8 is a flow chart showing operations in a subscription arrangement control unit 14 according to the first exemplary embodiment of the present invention.

Next, operations in the subscription arrangement control unit 14 according to this exemplary embodiment will be described with reference to FIGS. 8-10. FIG. 8 is a flow chart showing operations of the subscription arrangement control unit 14.

The subscription arrangement control unit 14 receives a key and a message from the message judgment unit 13 (S131). After that, the subscription arrangement control unit 14 performs subscription registration/deletion processing (S132) and subscription transfer processing (S133). Henceforth, the two processing will be described.

Figure 9:
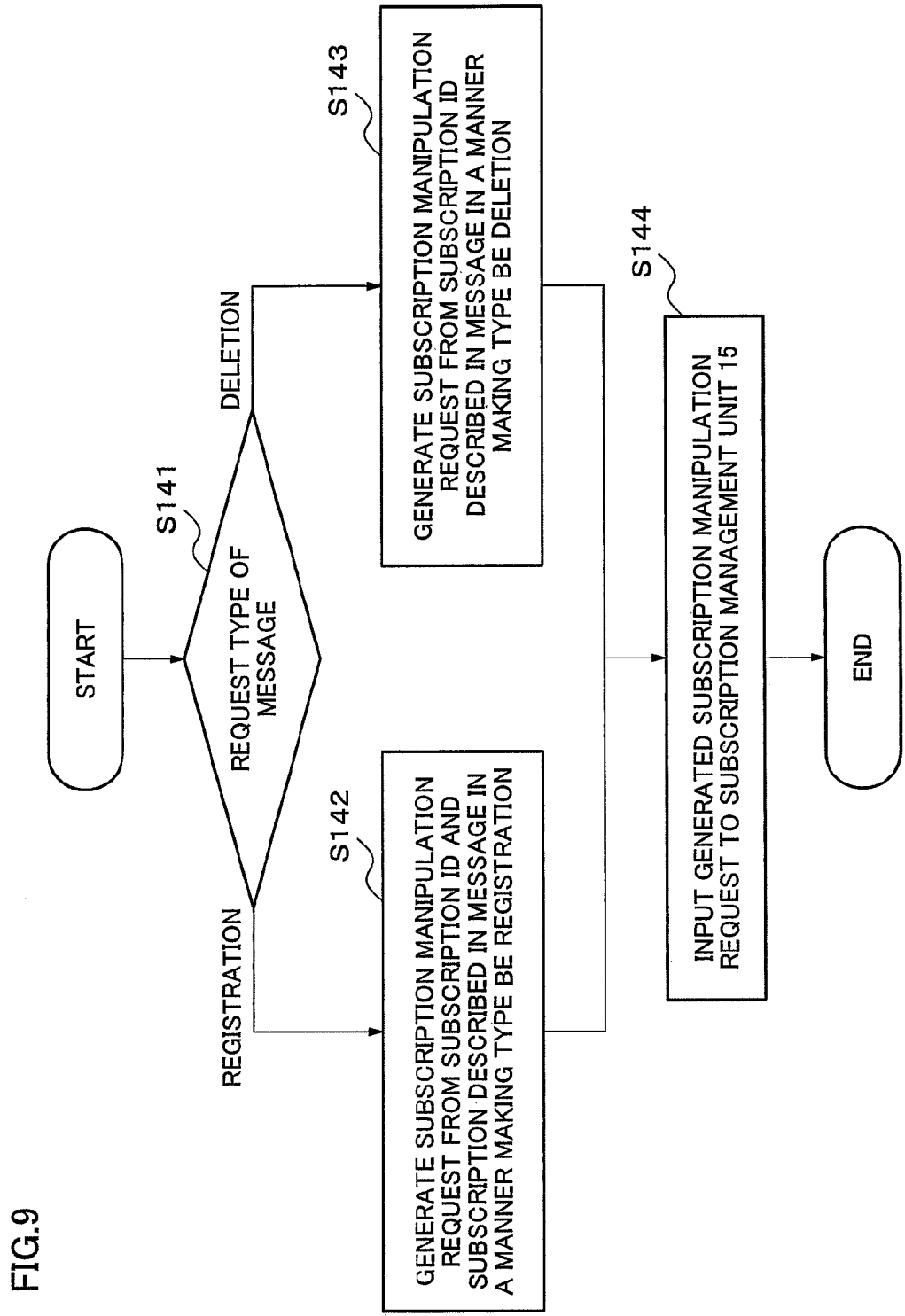
FIG. 9 is a flow chart of subscription registration and deletion processing according to the first exemplary embodiment of the present invention.

FIG. 9 is a flow chart showing subscription registration/deletion processing which the subscription arrangement control unit 14 performs. In the subscription registration/deletion processing, the subscription arrangement control unit 14 judges a request type of a message, first (S141). When the message is a registration request, the subscription arrangement control unit 14 generates a subscription manipulation request from a subscription ID and a subscription included in the message in a manner making the type be registration (S142), and inputs the generated subscription manipulation request to the subscription management unit 15 (S144).

On the other hand, when the message is a deletion request, the subscription arrangement control unit 14 generates a subscription manipulation request from a subscription ID included in the message in a manner making the type be deletion (S143), and inputs the generated subscription manipulation request to the subscription management unit 15 (S144).

Figure 13:
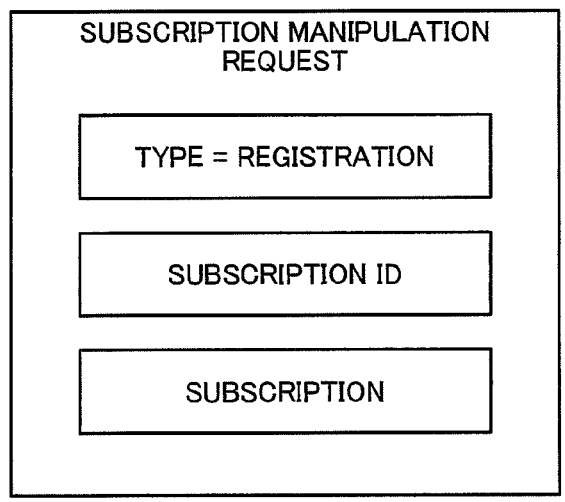
FIG. 13 is a diagram showing a subscription manipulation request when a type is registration.
Figure 14:
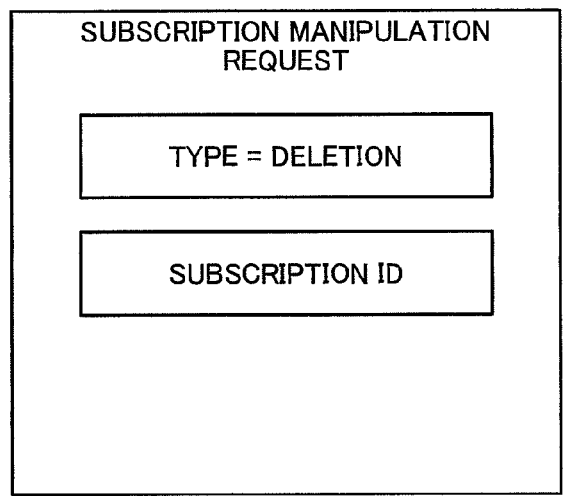
FIG. 14 is a diagram showing a subscription manipulation request when a type is deletion.
Figure 15:
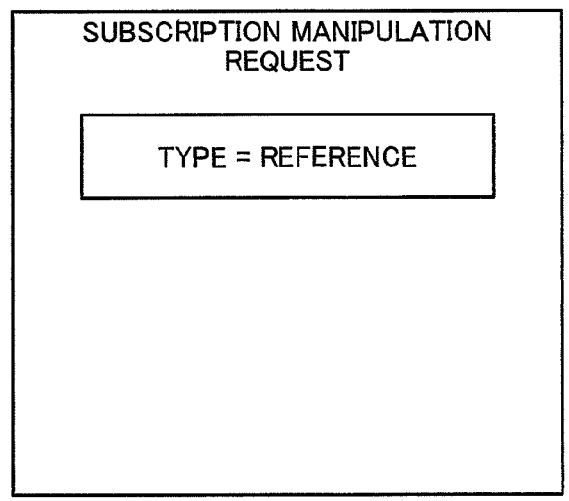
FIG. 15 is a diagram showing a subscription manipulation request when a type is reference.

Meanwhile, a subscription manipulation request includes a type as one of its components. A type includes registration, deletion and reference. Components of a subscription manipulation request are different for each type. A subscription manipulation request when a type is registration is shown in FIG. 13. When a type is registration, a subscription manipulation request includes a subscription ID and a subscription in addition to a type. A subscription manipulation request when a type is deletion is shown in FIG. 14. When a type is deletion, a subscription manipulation request includes a subscription ID in addition to a type. A subscription manipulation request when a type is reference is shown in FIG. 15. When a type is a reference, a subscription manipulation request includes only a type.

Figure 10:
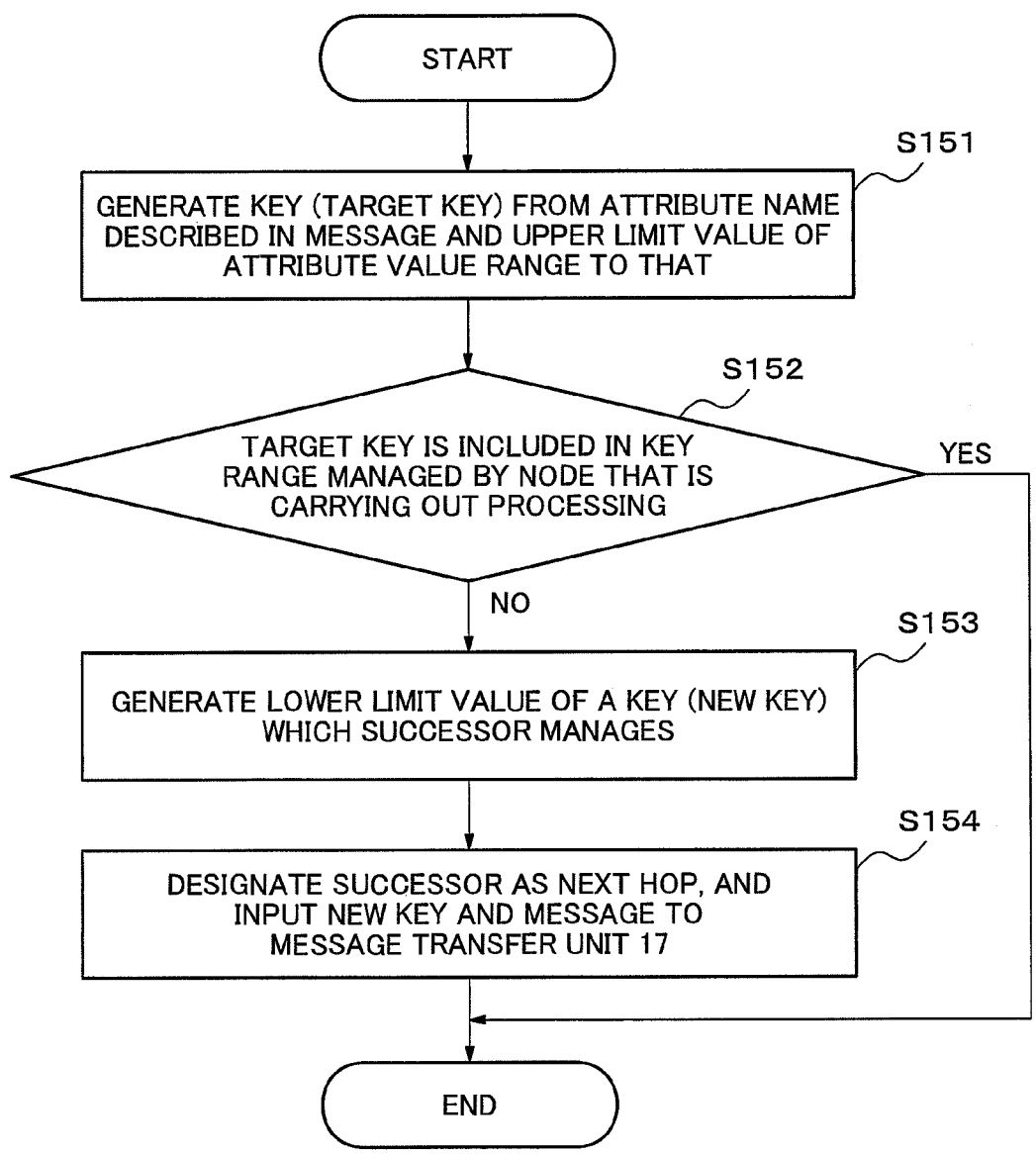
FIG. 10 is a flow chart of a subscription transfer processing according to the first exemplary embodiment of the present invention.

FIG. 10 is a flow chart showing subscription transfer processing. In the subscription transfer processing, the subscription arrangement control unit 14 generates a key (target key) from an attribute name included in a message and an upper limit value of an attribute value range to that, first (S151). Next, the subscription arrangement control unit 14 determines whether the target key is included in the key range managed by the node that is carrying out the processing (S152). When not being included, the subscription arrangement control unit 14 generates a lower limit value of a key (new key) which the successor (the next node when seen from a certain node on a ring constituted by nodes) manages (S153), designates the successor as a next hop after that, and inputs the new key and the message to the message transfer unit 17 (S154). When the target key is included in the key range which the node manages, the subscription arrangement control unit 14 does not input the key and the message to the message transfer unit 17.

Figure 11:
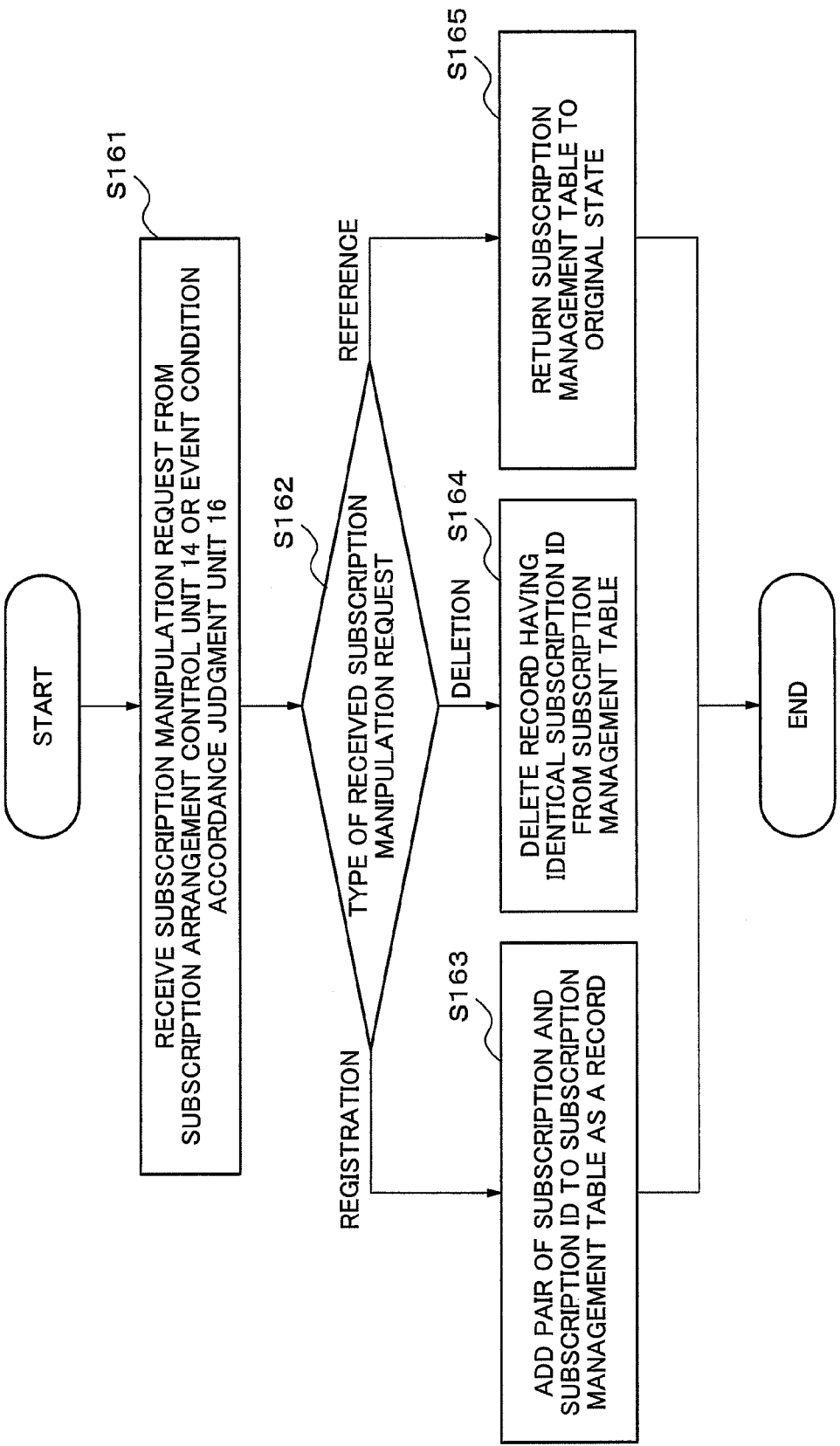
FIG. 11 is a flow chart showing operations in a subscription management unit 15 according to the first exemplary embodiment of the present invention.

Next, operations in the subscription management unit 15 according to this exemplary embodiment will be described with reference to FIG. 11. FIG. 11 is a flow chart showing operations of the subscription management unit 15.

The subscription management unit 15 has a subscription management table for managing a subscription ID and a subscription. An example of the subscription management table is shown in FIG. 12. A record in which a subscription ID and a subscription are correlated are stored in a subscription management table. The record of the first row of the subscription management table of FIG. 12 indicates an example in which a subscription ID is "sub1" and an event condition of a subscription is "50≤x≤150&150≤y≤250", and an application ID of a notification destination is "app1."

The subscription management unit 15 receives a subscription manipulation request from the subscription arrangement control unit 14 or the event condition accordance judgment unit 16 (S161).

When the subscription manipulation request is received, the subscription management unit 15 refers to the type of the received subscription manipulation request, first (S162). When the type is registration, the subscription management unit 15 adds a pair of the subscription and the subscription ID to the subscription management table as a record (S163). When the type is deletion, the subscription management unit 15 deletes a record having an identical subscription ID from the subscription management table (S164). When the type is reference, the subscription management unit 15 calls the subscription management table, and returns the table to the original state (S165) after reference.

Figure 16:
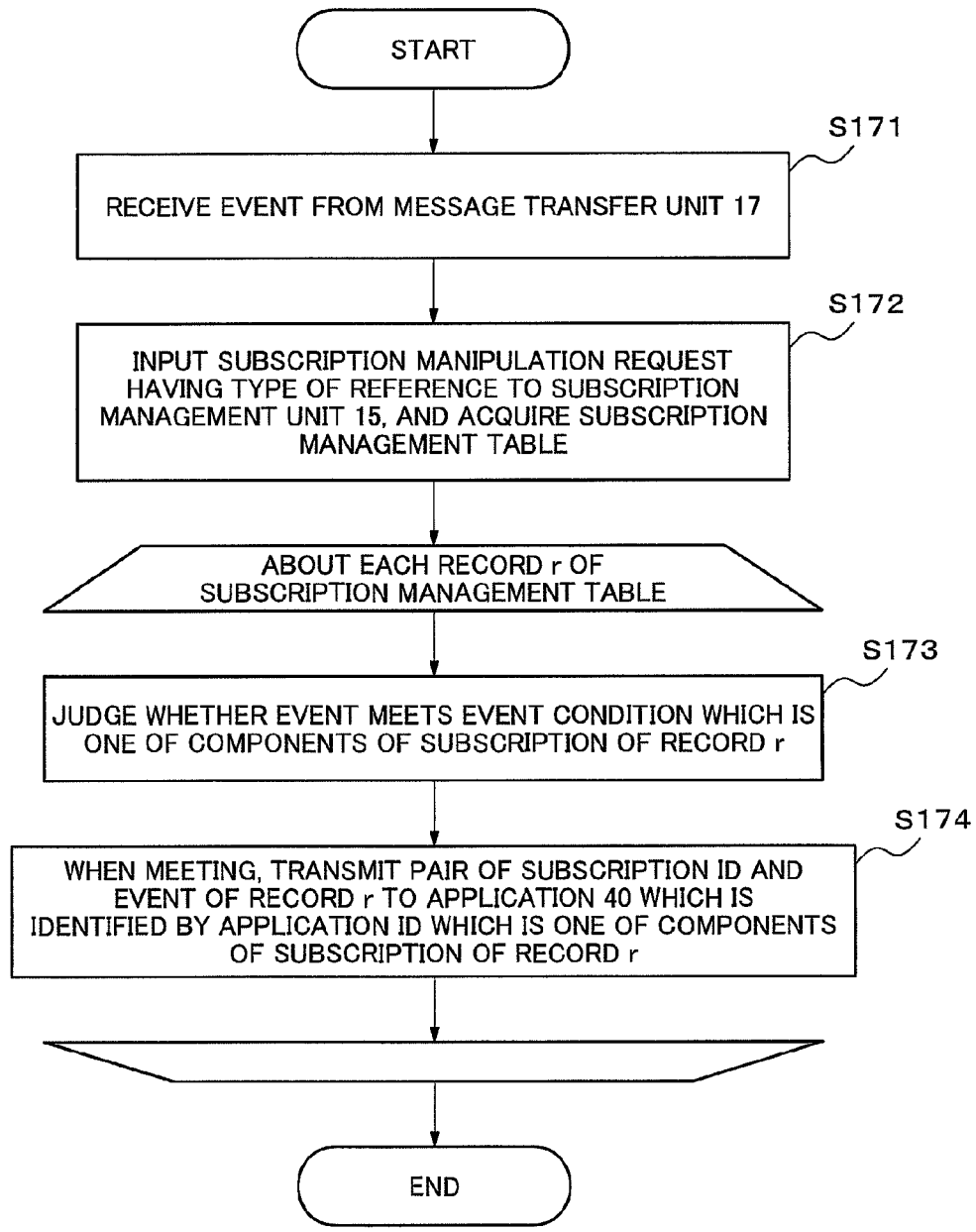
FIG. 16 is a flow chart showing operations in an event condition accordance judgment unit 16 according to an exemplary embodiment of the present invention.

Next, operations in the event condition accordance judgment unit 16 according to this exemplary embodiment will be described with reference to FIG. 16. FIG. 16 is a flow chart showing operations of the event condition accordance judgment unit 16.

When an event is received from the message transfer unit 17 (S171), the event condition accordance judgment unit 16 inputs a subscription manipulation request having the type of reference to the subscription management unit 15, and acquires a subscription management table (S172). The event condition accordance judgment unit 16 carries out the following processing about each record r of the acquired subscription management table. First, the event condition accordance judgment unit 16 judges whether the event meets an event condition which is one of components of the subscription of the record r (S173). When meeting, next, the event condition accordance judgment unit 16 transmits a pair of the subscription ID and the event of the record r to an application 40 which is identified by an application ID which is one of components of the subscription of the record r (S174). Meanwhile, when the event does not meet the event condition which is one of components of the subscription of the record r, the event condition accordance judgment unit 16 does not perform event notification to an application.

Figure 17:
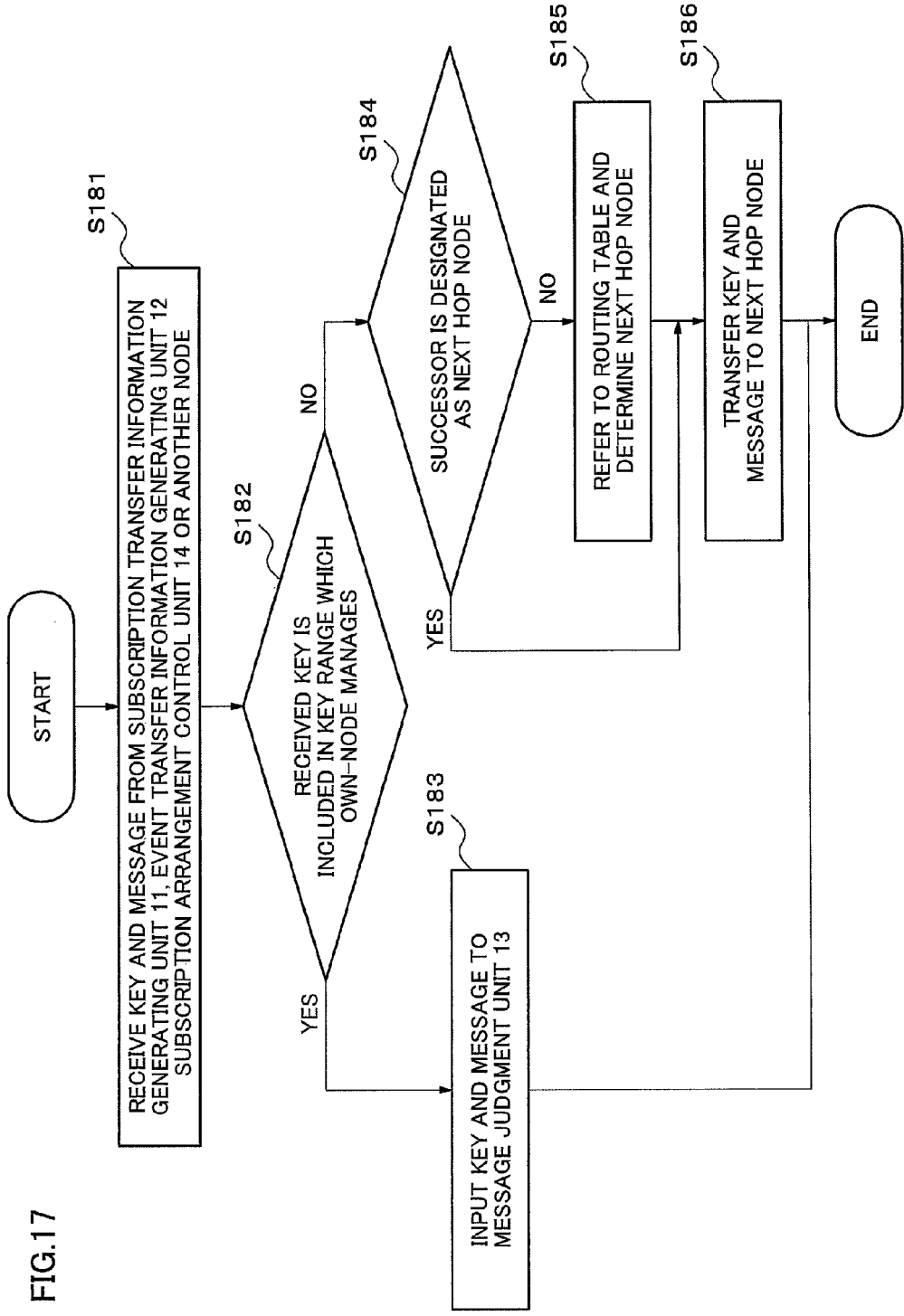
FIG. 17 is a flow chart showing operations in a message transfer unit 17 according to the first exemplary embodiment of the present invention.

Next, operations in the message transfer unit 17 according to this exemplary embodiment will be described with reference to FIG. 17. FIG. 17 is a flow chart showing operations of the message transfer unit 17.

The message transfer unit 17 receives a key and a message from the subscription transfer information generating unit 11, the event transfer information generating unit 12, the subscription arrangement control unit 14 or a node different from the node in which this processing is being operated (S181). When the key and the message are received, the message transfer unit 17 determines whether the received key is included in the key range which the node manages (S182). Determination here may be made possible by: having an optional storage device such as a memory and a hard disk in one of the components in the node 10 including the message transfer unit 17; storing key range information which indicates a key range managed by the node 10 in the storage device; and comparing the received key and the key range information. This storage device corresponds to the processing object information storage unit 53 shown in FIG. 1.

An example of processing in which the message transfer unit 17 determines whether a received key is included in the key range managed by a node or not will be described. In a node, it is judged whether a received key is included in the range where "(an upper limit value of a key range managed by itself)−(the lower limit value of the key range managed by itself)" will be the smallest.

For example, it is supposed that a received key is "x:050". Referring to FIG. 2, because the upper limit value is "x:240" and the lower limit value is "x:160" in the node a, "x:050" is not included in the smallest range between them. Accordingly, in the node a, the message transfer unit 17 determines that the received key is not included. On the other hand, because the upper limit value is "x:080" and the lower limit value is "x:000" in the node c, "x:050" is included in the smallest range between them. Accordingly, in the node c, the message transfer unit 17 determines that the received key is included.

As a different example, it is supposed that the received key is "z:050". Referring to FIG. 2, because the upper limit value is "x:240" and the lower limit value is "x:160" in the node a, "z:050" is not included in the smallest range between them. Accordingly, in the node a, the message transfer unit 17 determines that the received key is not included. On the other hand, an upper limit value is "x:000 and a lower limit value is "y:200" " in the node e. Because "x<y<z . . . <x" holds in the cyclic order relation of attribute names set in advance, "z:050" is included in the smallest range between them. Accordingly, in the node c, the message transfer unit 17 determines that the received key is included. On this occasion, when the order relation between the attribute name y used for generation of the lower limit value and the attribute name x used for generation of the upper limit value is not identical with an order relation in a range before taking a round, the message transfer unit 17 may realize the above-mentioned determination by determining that a received key is included in the key range when the received key is smaller than the lower limit value or larger than the upper limit value.

When a received key is included in the key range which the node manages, the message transfer unit 17 inputs the key and the message to the message judgment unit 13 (S183). When the received key is not included in the key range which the node manages, the message transfer unit 17 determines whether the successor is designated as a next hop node or not (S184). When the successor is designated as a next hop node, the message transfer unit 17 transmits the key and the message to the next hop node (S186). On the other hand, when the successor is not designated as a next hop node, the message transfer unit 17 refers to a routing table and determines a node of a forwarding destination (S185). Then, the message transfer unit 17 transmits the key and the message to the next hop node (S186).

The message transfer unit 17 has a routing table. A routing table manages a pair of a key and a network address of a node. For example, a routing table is stored in an optional storage device provided in the message transfer unit 17. A method of generation and maintenance of a routing table and a method to determine a node of a forwarding destination of a message with reference to a routing table depend on a routing protocol. As an example of a routing protocol, a method described in the section 3.3 of non-patent literature 2 may be used. A routing protocol may be decided optionally, and, for example, the message transfer unit 17 may perform transmission so that a key and a message may reach a node for which "(a key to be transmitted)−(the lower limit value of the key range which a node manages)" will be the smallest" among nodes for which "(a key to be transmitted)>(the lower limit value of the key range which a node manages)" holds.

Figure 18:
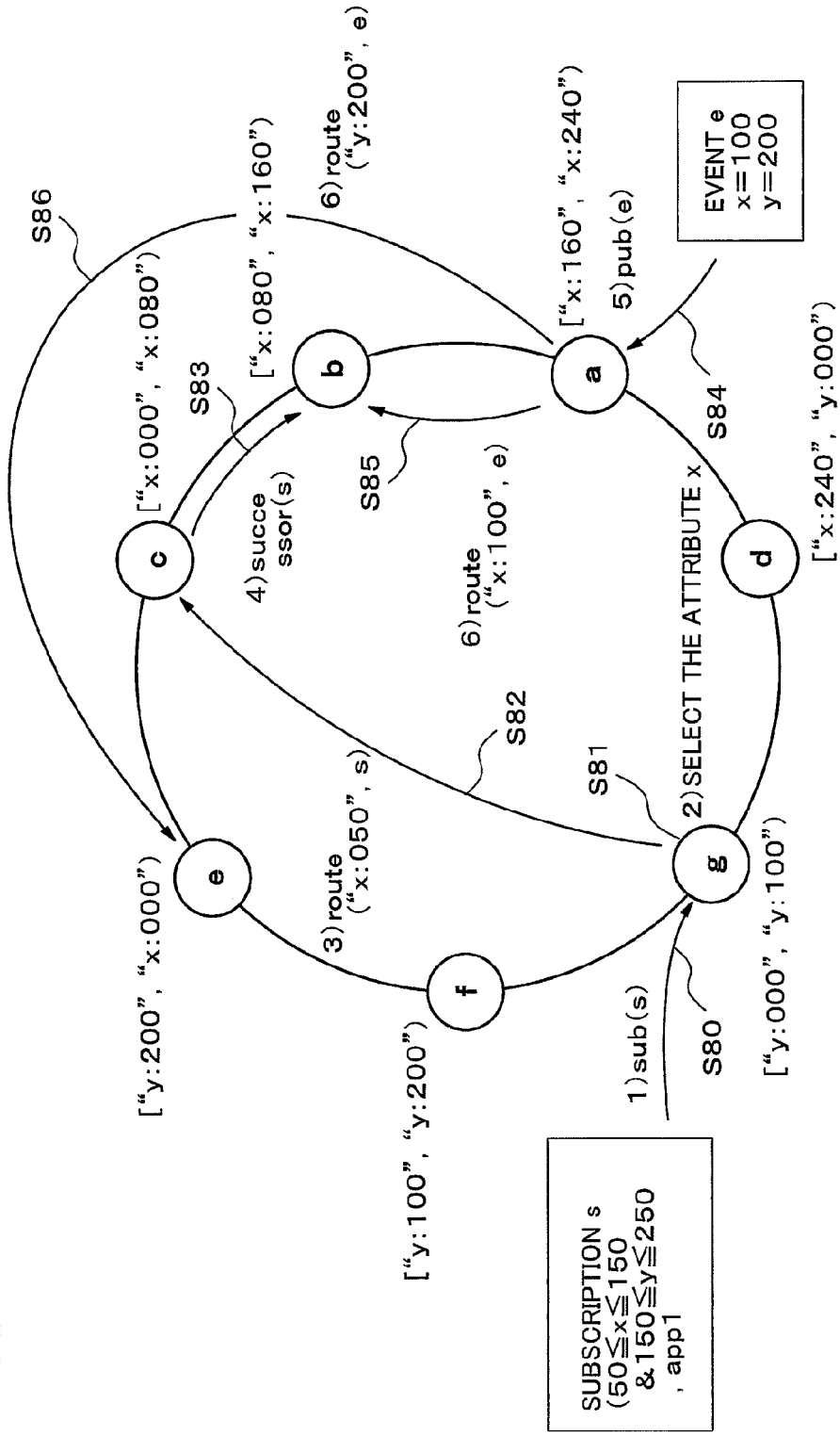
FIG. 18 is a diagram showing an example of operations of the event distribution system 1 according to the first exemplary embodiment of the present invention.
Figure 19:
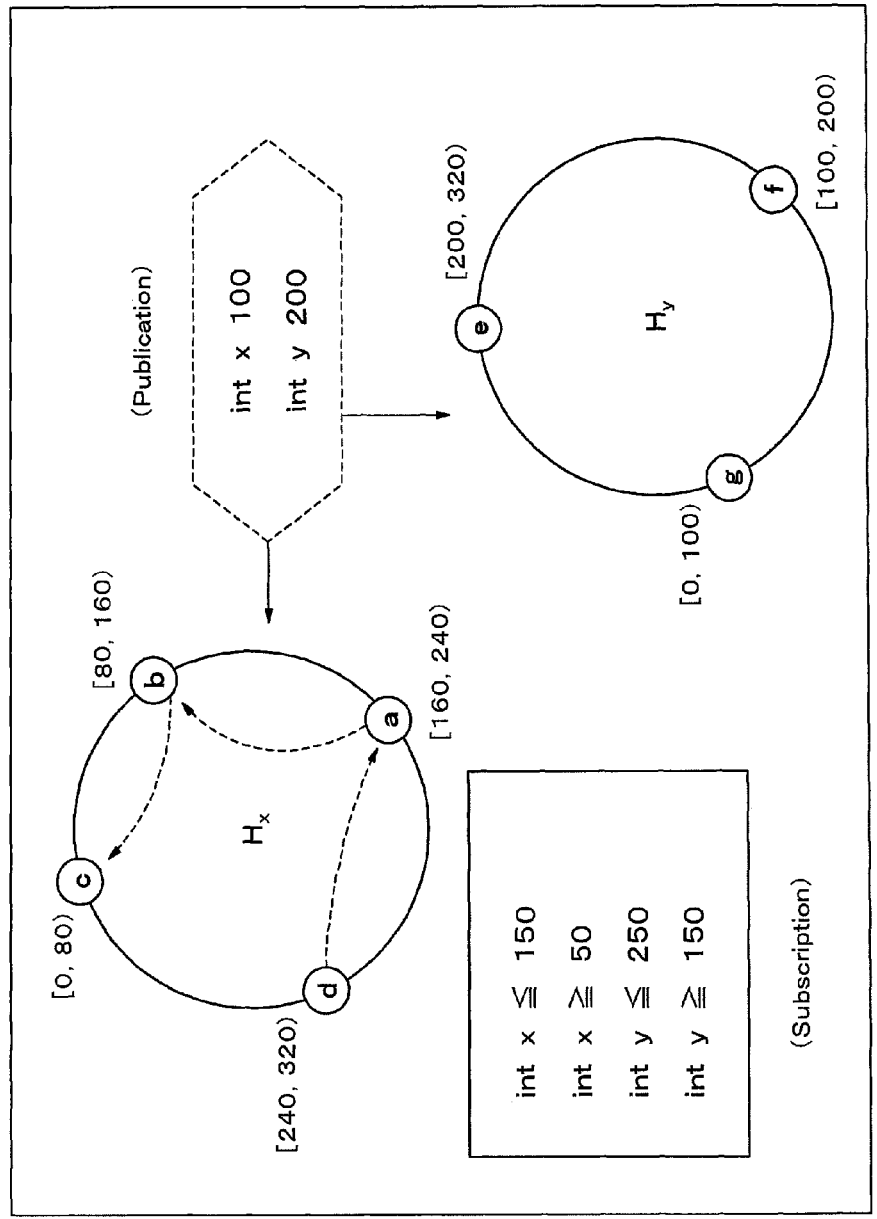
FIG. 19 is a diagram illustrating the background art.

Next, operations in the event distribution system 1 according to this exemplary embodiment will be described with reference to FIG. 18. FIG. 18 is a diagram showing an example of operations of the event distribution system 1. As shown in FIG. 18, the node c manages a range of ["x:000", "x:080"), the node b manages a range of ["x:080", "x:160"), the node a manages a range of ["x:160", "x:240"), the node d manages a range of ["x:240", "y:000"), the node g manages a range of ["y:000", "y:100"), the node f manages a range of ["y:100", "y:200"), and the node e manages a range of ["y:200", "x:000"), for example.

It is supposed that the node g which is a component of the event distribution system 1 has received a subscription s (50≤x≤150&150≤y≤250, app1) from the subscriber 31 (S80).

The node g selects the attribute name x from the attribute name x and the attribute name y which constitute the subscription s in the subscription transfer information generating unit 11 using a method mentioned above, for example (S81). Next, the subscription transfer information generating unit 11 generates a key "x:050" from the attribute name x and 50 which is the lower limit value of the attribute value range to that. The subscription transfer information generating unit 11 combines the subscription ID, the subscription and the request type (here, the case where the request type is a registration request is taken as an example) that have been inputted from the subscriber 31, and the selected attribute name "x" as a message. The subscription transfer information generating unit 11 inputs the key and the message to the message transfer unit 17. Then, the message transfer unit 17 transmits the inputted key and the message to a node which manages the key according to a routing protocol.

In this exemplary embodiment, the key and the message transmitted from the message transfer unit 17 of the node g finally reach the message transfer unit of the node c which manages the key "x:050" via the message transfer unit 17 of nodes of no smaller than 0 (S82). It may be arranged such that the key and the message transmitted from the node g reach the node c via the nodes e and f, or reach the node c directly from the node g. Here, the key and the message reach the node c where "(a key to be transmitted)−(the lower limit value of the key range which a node manages)" will be smallest among nodes where "(a key to be transmitted)>(the lower limit value of the key range which a node manages)" holds.

The message transfer unit 17 of the node c inputs the key and the message to the message judgment unit 13 because the received key "x:050" is included in the key range ["x:000", "x:080") which the node c manages. The message judgment unit inputs the key and the message to the subscription arrangement control unit 14 because the message includes a subscription. Because the example here is the case where a request type is a registration request, the subscription arrangement control unit 14 registers a pair of the subscription ID and the subscription with the subscription management unit 15 (refer to the flow of FIG. 9).

In addition, a key "x:150" generated from the attribute name "x" included in the message and the upper limit value 150 of the attribute value range to that is not included in the key range ["x:000", "x:080") which the node c manages. Therefore, the subscription arrangement control unit 14 inputs the lower limit value of a key which the successor manages (new key) "x:080" and the inputted message to the message transfer unit 17 (refer to the flow of FIG. 10).

Here, as the successor of the node c, the node b which manages the key range ["x:080", "x:160") following the key range ["x:000", "x:080") managed by the node c has been set already. In other words, when a key "x:150" generated from the upper limit value 150 of the attribute value range of the message is not included in the node c, the attribute value range of the message will be included in the node b which manages a key range following the key range which the node c manages. Accordingly, in order to make the subscription of the message be also registered in the node b, the node c transmits the key "x:080" generated from the lower limit value of the key range which the node b manages and the message to the node b. Therefore, for the message transfer unit 17, the node b which is a successor is designated as a next hop by the subscription arrangement control unit 14. Then, the message transfer unit 17 transmits the inputted key and the message to the node b.

The key and the message transmitted from the message transfer unit 17 of the node c reach the node b (S83). Because the received key "x:080" is included in the managed key range ["x:080", "x:160"), the message transfer unit 17 of the node b inputs the key and the message to the message judgment unit 13. The subscription ID and the subscription of which a message is composed are registered with the subscription management unit 15 of the node as to the same case with the processing in the node c. A key "x:150" generated from the attribute name "x" included in the message and the upper limit value 150 of the attribute value range to that is included in the key range ["x:080", "x:160") which the node b manages. Therefore, the subscription arrangement control unit 14 does not input the key and the message to the message transfer unit 17. Therefore, the message is not forwarded. As a result of such processing, the subscription s will be held by the node c and the node b.

Next, it is supposed that the node a which is a component of the event distribution system 1 has received an event e (x=100, y=200) from the publisher 32 (S84). Because the event includes the attribute name x and the attribute name y, the event transfer information generating unit 12 of the node a generates a key "x:100" for the attribute name x and a key "y:200" for the attribute name y. The event transfer information generating unit 12 inputs the event to the message transfer unit 17 as a message for each key. Then, the message transfer unit 17 transmits the inputted key and the message to a node which manages the key according to a routing protocol.

The message is transmitted to a node which manages each of the keys. The key "x:100" and the message transmitted with the key reach the node b (S85). The key "y:200" and the message transmitted with the key reach the node e (S86).

When the key "x:100" and the event reach the node b, because the received key "x:100" is included in the managed key range ["x:080", "x:160"), the message transfer unit 17 of the node b inputs the key and the message to the message judgment unit 13. Because the message includes an event, the message judgment unit 13 inputs the key and the message to the event condition accordance judgment unit 16. The event condition accordance judgment unit 16 acquires the subscription management table from the subscription management unit 15. The event condition accordance judgment unit 16 judges that an event condition is met because the event condition of the subscription s registered with the subscription management table is "(50≤x≤150) and (150≤y≤250)" and the attribute value of the event is "x=100, y=200". Therefore, the event condition accordance judgment unit 16 notifies an application app1 of the event (refer to the flow of FIG. 16).

When the key "y:200" and the event reach the node e, because the received key "y:200" is included in the key range ["y:200", "x:000") which the node e manages, the message transfer unit 17 of the node e inputs the key and the message to the message judgment unit 13. The message judgment unit 13 inputs the key and the message to the event condition accordance judgment unit 16 because the message includes an event. The event condition accordance judgment unit 16 acquires the subscription management table from the subscription management unit 15. Then, the event condition accordance judgment unit 16 judges that an event condition is not met because the subscription s is not registered with the subscription management table although the attribute value of the event is "x=100, y=200". Therefore, the event condition accordance judgment unit 16 does not notify the application of the event.

The event distribution system 1 shown in FIG. 2 and FIG. 18 assigns keys generated from the attribute name x or the attribute name y to many nodes in a dividing manner. The reason of this is that an administrator or the like of the event distribution system 1 assumes that an attribute designated by a subscription registered with the event distribution system 1 is only the attribute name x or the attribute name y (a case including the both of them are also included). When a subscription which designates a condition of the attribute name x or the attribute name y is registered and an event including the attribute name x or the attribute name y occurs, the event distribution system 1 needs to perform matching processing between the event and the subscription. By assigning keys generated from the attribute name x and the attribute name y to a plurality of nodes in a dividing manner, it is possible for the event distribution system 1 to disperse matching processing and level the event processing load of the event distribution system 1.

Next, with reference to FIG. 20, operations in the event distribution system 1 according to this exemplary embodiment when a subscription in which an attribute name z which has not been designated until then is designated is subscribed will be described.

It is supposed that the node g which is a component of the event distribution system 1 has received the subscription s (50≤z≤150, app1) from the subscriber 31 (S90). The subscription transfer information generating unit 11 of the node g generates a key "z:050" from the attribute name z and a value 50 which is the lower limit value of the attribute value range. The subscription transfer information generating unit 11 inputs the key and the message to the message transfer unit 17 of the node g. Here, the message is data including a subscription ID, a subscription, a request type and an attribute name "z" inputted from the subscriber 31 (S91).

Next, the message transfer unit 17 of the node g transmits the inputted key and the message to a node which manages the key according to a routing protocol (S92).

The key "z:050" will reach a node with which "(a key to be transmitted)−(the lower limit value of the key range which the node manages)" becomes the smallest among nodes with which "(a key to be transmitted)>(the lower limit value of a key range which a node manages)" holds. Here, when the lower limit value of a key range which each node manages is checked with reference to FIG. 2, the lower limit value of the key range which the node a manages is "x:160". The lower limit value of the key range which the node b manages is "x:080". The lower limit value of the key range which node c manages is "x:000". The lower limit value of the key range which the node d manages is "x:240". The lower limit value of the key range which the node e manages is "y:200". The lower limit value of the key range which node f manages is "y:100". The lower limit value of the key range which the node g manages is "y:000". On the other hand, an order relation of attribute names is "x<y<z" in a range before a round is taken. Therefore, a node with which "(a key to be transmitted)−(the lower limit value of the key range which the node manages)" is the smallest among nodes with which "(a key to be transmitted)>(the lower limit value of a key range which a node manages)" holds will be the node e.

Accordingly, a key and a message transmitted from the message transfer unit 17 of the node g finally reach the message transfer unit 17 of the node e that manages the key "z:050" via the message transfer unit 17 of nodes of no smaller than 0, and are held by the node e.

Next, it is supposed that the node a that is a component of the event distribution system 1 has received the event e (z=100) from the publisher 32 (S93). The event transfer information generating unit 12 of the node a generates a key "z:100" to the attribute name z. After that, similarly to the case of transfer of a subscription, the transmitted event reaches the node e (S94).

Next, in a case when an quantity of events and subscriptions in which the attribute name z is designated is becoming large, operations when the event distribution system 1 changes a key range managed by each node for more resources may be assigned to keys generated from the attribute name z will be described using FIG. 1, FIG. 20 and FIG. 21

Figure 20:
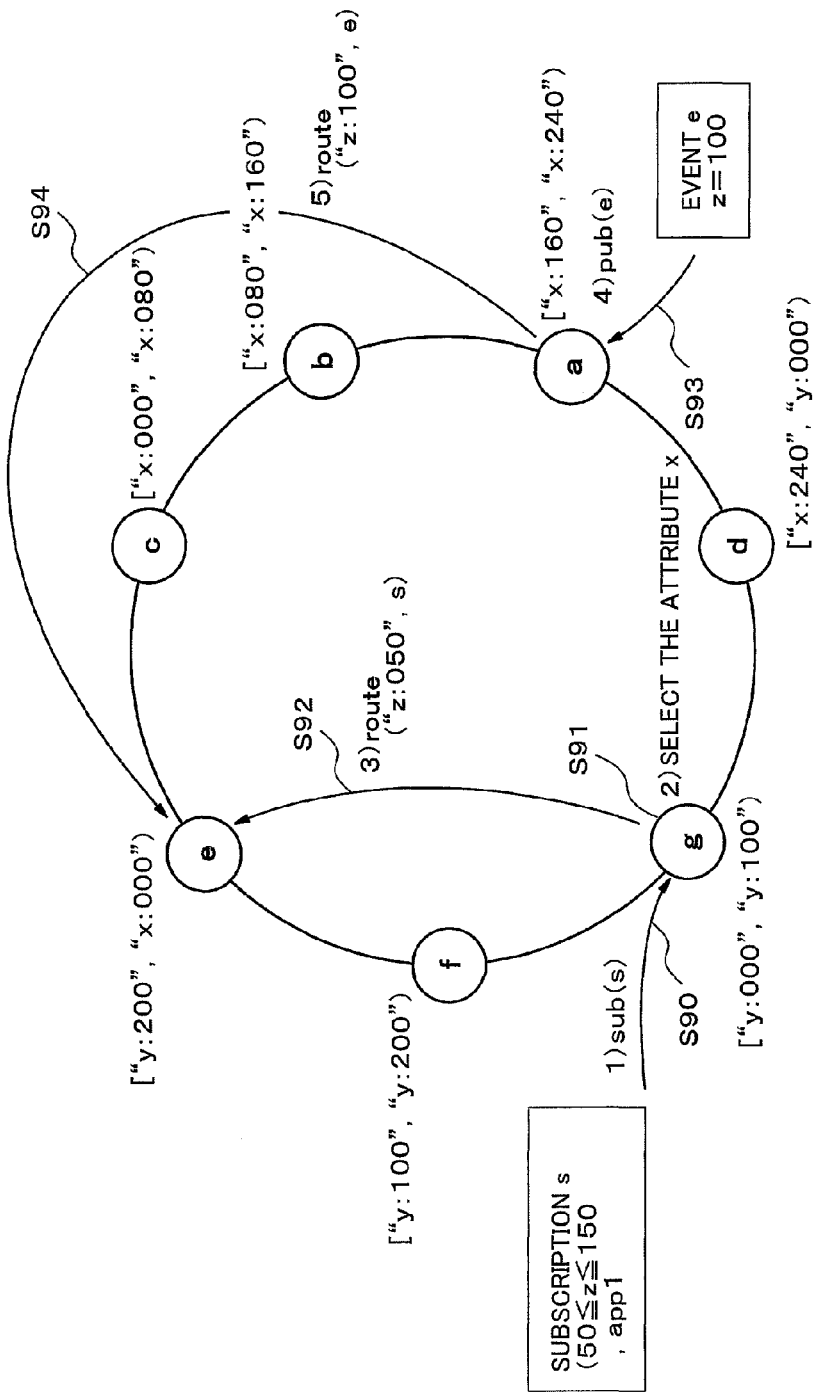
FIG. 20 is a diagram showing an example of operations of the event distribution system 1 in the first exemplary embodiment of the present invention.

First, as shown in FIG. 20, it is assumed that the node e manages a key range ["y:200", "x:000"), and the node f manages a key range ["y:100", "y:200").

When the node e receives a subscription or event information, the processing object judgment unit 52 counts the number of attribute names included in at least one of the subscription and the event information received in a regular time interval with reference to the attribute name included in the subscription or the event information. Then, when the number of the attribute names is not less than a threshold value stored in the processing object information storage unit 53 in advance, for example, or, when a rate of increase exceeds a fixed value, the node e generates a key "y:200" which is the lower limit value of the key range which it manages by the key information generating unit 51, and, in addition, generates information of the changed part of the key range. About how to determine a changed key range, it is given by a system parameter, for example. In the case where the system parameter designates that one of less than the lower limit value of an attribute value to an attribute name for which the number of received event information in a fixed time period has become no smaller than a threshold value to be a changed part of the key range, for example, the node e makes a changed part of the key range be ["y:200", "z:000"), and decides to change the key range managed by itself from ["y:200", "x:000") to ["z:000", "x:000") as shown in FIGS. 20 and 21, for example. Meanwhile, a changed part of the key range may be set by an administrator in advance, or the processing object information storage unit 53 may determine it with reference to a table. In this case, the processing object information storage unit 53 may possess a change range management table (not illustrated) which correlates a rate of increase of attribute names designated by subscriptions received by a node and a changed part of the key range, for example. Or, the processing object information storage unit 53 may possess a change range management table (not illustrated) which correlates a rate of increase or the like of attribute names included in events and a changed part of the key range. Or, the processing object information storage unit 53 may possess a change range management table (not illustrated) which correlates a range of an attribute value corresponding to an attribute name included in subscriptions or event information and a changed part of the key range. In this case, a change range management table may manage a rate of increase of an attribute name which a subscription designates, or a rate of increase of an attribute name included in event information or a changed part of the key range in which a larger range of an attribute value corresponding to an attribute name will be a larger changed part of the key range, for example. The key information generating unit 51 generates a key range ["y:200", "z:000"). The information transfer unit 54 transmits the generated key and the key range to a successor.

When a node which is the successor receives the key and the key range, the processing object judgment unit 52 determines whether the received key is the upper limit value of the key range managed by itself with reference to the key range managed by itself stored in the processing object information storage unit 53. When determining that the received key is not the upper limit value of the key range which it manages, the processing object judgment unit 52 transmits the key to the next successor. On the other hand, when the received key is the upper limit value of the key range managed by itself, the processing object information storage unit 53 stores a new key range which is made by adding the received key range to the key range which it manages as a new key range managed by itself. For example, when the node f of FIG. 20 receives a key "y:200", because the key and the upper limit value of the key range ["y:100", "y:200") which the node f manages are identical with each other, the node f stores a new key range ["y:100", "z:000") made by adding the received changed part of the key range ["y:200", "z:000") to the key range ["y:100", "y:200") managed by itself as a key range which it manages newly in the processing object information storage unit 53. Then, the node transmits to the effect that a key range has been changed to the next successor as well as the received key information "y:200" and the changed part of the key range ["y:200", "z:000").

When a node which is the next successor receives the information to the effect that the key range has been changed and the key information "y:200" and the changed part of the key range ["y:200", "z:000"), it determines whether the key information "y:200" is the lower limit value of the key range which it manages or not. When it is not the lower limit value of the key range which it manages, it further transmits the information to the effect that the key range has been changed, the key information and the changed part of the key range to the next successor. On the other hand, when the received key is the lower limit value of the key range which it manages, the processing object information storage unit 53 stores a range made by decreasing the received changed part of the key range from the key range which it manages as a new key range to be managed by itself. In this exemplary embodiment, because the lower limit value of the key range ["y:200", "x:000") which the node e manages and the key "y:200" are identical, the processing object information storage unit 53 changes the key range to ["z:000", "x:000") which is made by decreasing the range of ["y:200", "z:000") from ["y:200", "x:000").

Figure 21:
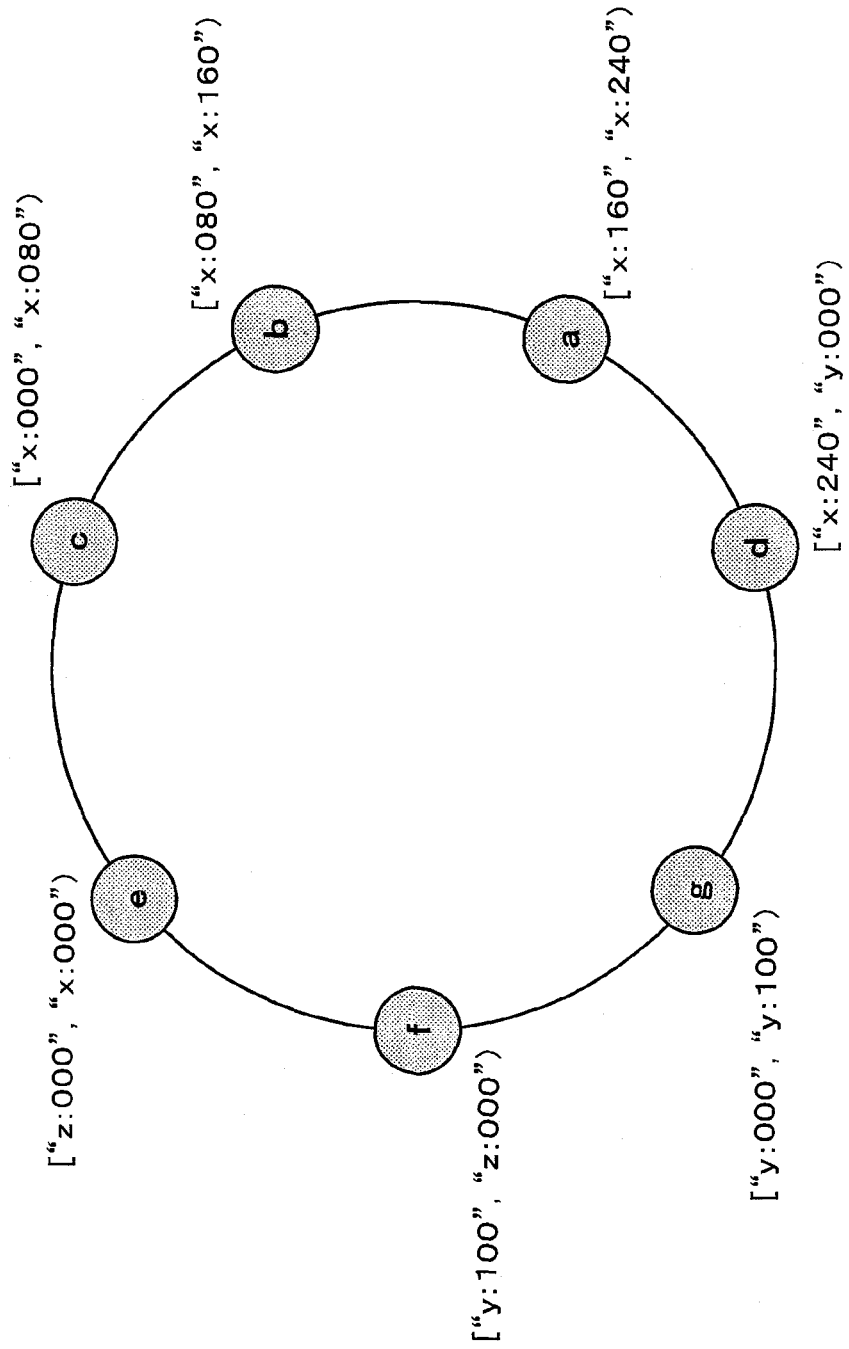
FIG. 21 is a diagram showing an example of operations of the event distribution system 1 in the first exemplary embodiment of the present invention.

As a result, the event distribution system 1 can change a key range which a node manages as shown in FIGS. 20 and 21, for example. That is, the node e can change the managed key range to ["z:000", "x:000") from ["y:200", "x:000"), and the node f can change the managed key range to ["y:100", "z:000") from ["y:100", "y:200"). Meanwhile, on the occasion of changing a key range, the node e may be arranged such that it transmits an upper limit value to a successor instead of a lower limit value. In this case, a lower limit value and an upper limit value are paraphrased appropriately in the above-mentioned sentences. Also, in this case, the key range which the node c manages is changed instead of the node f. The reason of this is that the node c is a node which manages the upper limit value of the key range of the node e as the lower limit value of a key range. More generally, the node e may transmit both of the lower limit value and the upper limit value of a key range which it manages to a successor. In this case, the node e can divide its own segment into a plurality of segments, and assign a segment including the lower limit value of the node e to the node f and assign a segment including the upper limit value of the node e to the node c by the above-mentioned method. In the example of the above, although the node e changes the key range which it manages after it has been confirmed that the node f has changed the key range, the node e may change the key range which it manages at the stage to transmit a changed part of the key range to a successor. Information which a node transmits may be transmitted to other nodes besides a successor. For example, the above-mentioned node e may generate only a changed part of the key range by the key information generating unit 51 to transmit it to the node f that is a predecessor. In this case, the node f that is a predecessor may make a segment made by merging the key range which it manages and the received changed part of the key range as a key range which it manages newly.

The whole picture of this change in a key range will be described using FIG. 22 and FIG. 23. The inner side circle of FIG. 22 indicates a state that attribute names which each node manages are only three of x, y and z, and they have cyclic order relation. It is supposed that each range of an attribute value for each attribute name is from 0 to 320. The outside circle of FIG. 22 indicates the key range which each node manages. For example, the node c manages ["x:000", "x:080"), the node b manages ["x:080", "x:160"), the node a manages ["x:160", "x:240"), the node d manages ["x:240", "y:000"), the node g manages ["y:000", "x:100"), the node f manages ["y:100", "y:200"), the node e manages ["y:200", "x:000").

Figure 23:
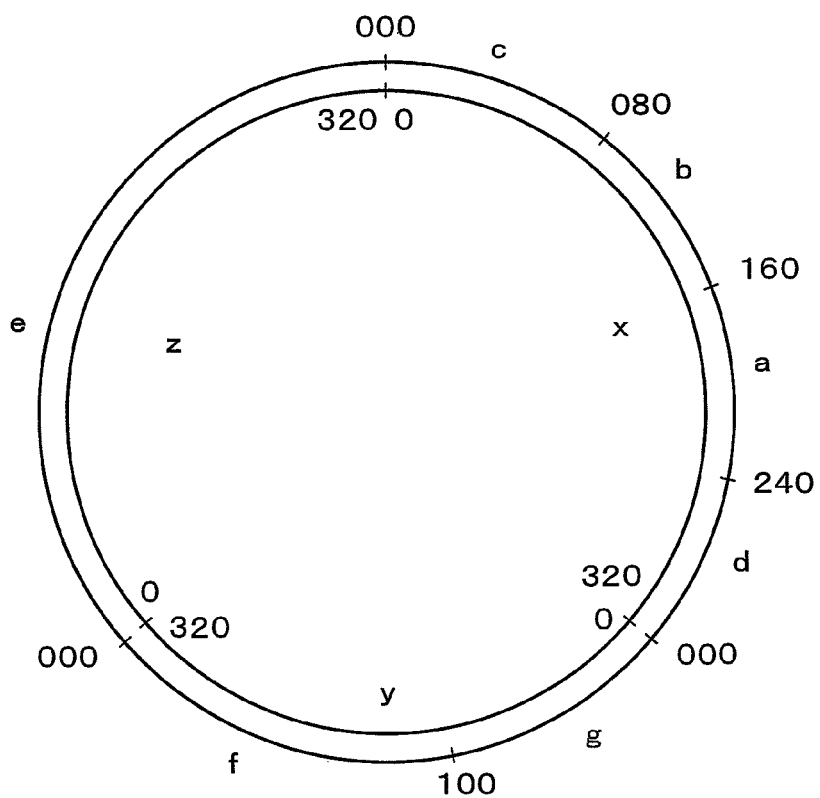
FIG. 23 is a diagram illustrating change in the key range management in the first exemplary embodiment of the present invention.

FIG. 23 shows a state that the event distribution system 1 has changed a key range which a node manages. For example, FIG. 23 shows the state in which the range that the node f manages is ["y:100", "z:000") and the range that the node e manages is ["z:000", "x:000").

Figure 22:
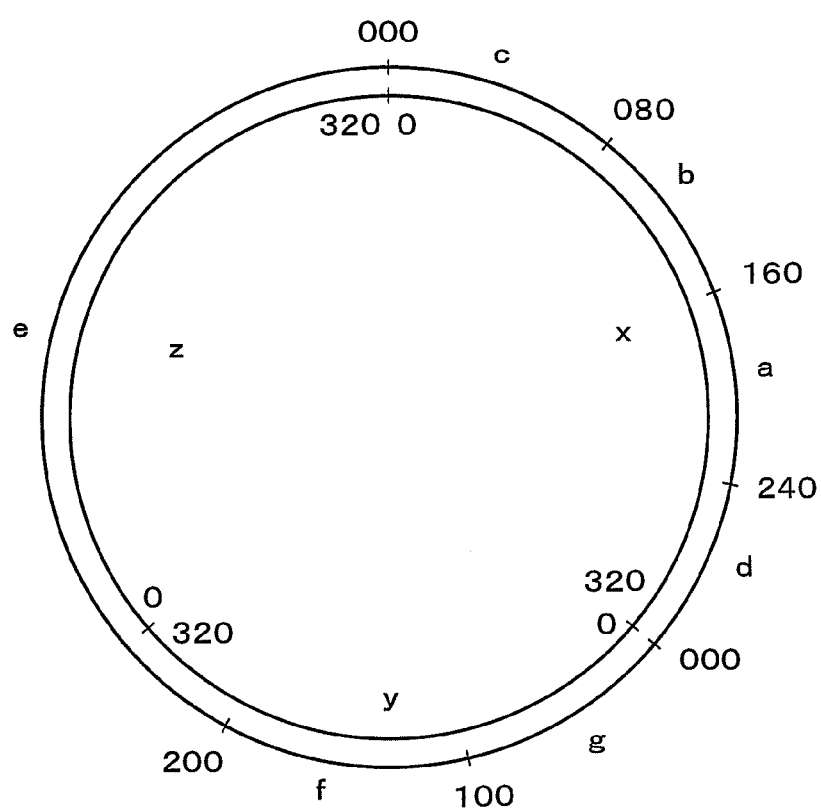
FIG. 22 is a diagram illustrating change in the key range management in the first exemplary embodiment of the present invention.

At that time, because the key range which the node e has been managing originally is the range of 120 (=320−200) of the key range 200≤y≤320 made up of the attribute name y and the range of 320 (=320−0) of the key range 0≤z≤320 made up of the attribute name z as shown in FIG. 22, the proportion of the key range made up of the attribute name z to the whole key range is 320/(120+320)=$8/11$. On the other hand, after the key range change, because the key range which the node e manages is only the range of 320 (=320−0) of the key range 0≤z≤320 made up of the attribute name z as shown in FIG. 23, the proportion of the key range made up of the attribute name z to the whole key range will be 320/320=1. Thus, the proportion of the key range made up of the attribute name z will be larger than the proportion of the key range made up of the attribute name z to the key range which the node e has been managing originally. This corresponds to a state that, when events and subscriptions designating the attribute name z are increasing, the event distribution system 1 increases the proportion of a key range generated from the attribute name z to the key range managed by a node. In the same way, the event distribution system 1 may change the allocation of a key range so that not only the node e but also a larger number of nodes may manage a key range made up of the attribute z.

Figure 24:
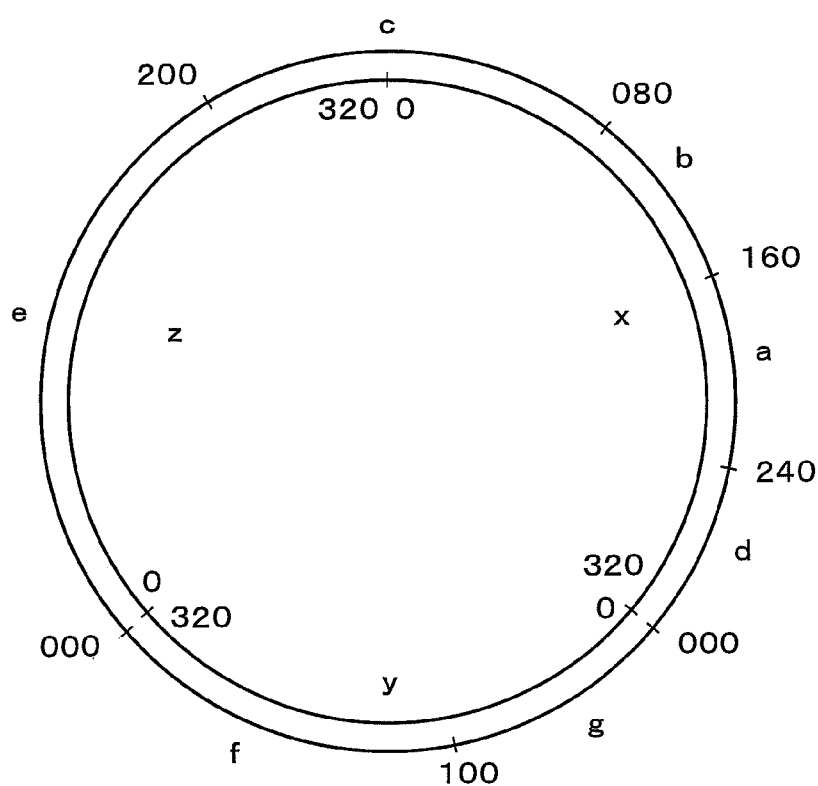
FIG. 24 is a diagram illustrating change in the key range management in the first exemplary embodiment of the present invention.

FIG. 24 indicates the state that a key range ["y:200", "x:000") which the node e has been managing originally is changed to a key range ["z:000", "z:200") newly. FIG. 24 shows the state that, in association with this, the node f has changed the key range from ["y:100", "y:200") to ["y:100", "z:000"), and the node c has changed the key range from ["x:000", "x:080") to ["z:200", "x:080"). As mentioned above, the node e can change the key range from ["y:100", "y:200") to ["y:100", "z:000") by transmitting a specified range ["y:200", "z:000") including the lower limit value of the key range which it has been managing to other nodes and the node f which has received that adding the range to the key range which it manages. In the same way, the node e can change the key range from ["x:000", "x:080") to ["z:200", "x:080") by transmitting a specified range ["z:200", "x:000") including the upper limit value of the key range which it has been managing to other nodes, and the node c that has received that adding the range to the key range which it manages.

Thus, when events and subscriptions by which the attribute name z is designated are increasing, the event distribution system 1 can balance a load by changing key allocation such that more resources are assigned to the key generated from the attribute name z.

As has been described above, when a condition of an attribute which has not been designated until then is designated in a subscription and an event, this exemplary embodiment can transfer the subscription and the event in a processing time of the order the same as a case where an attribute having been designated until then is designated. In other words, the event distribution system 1 can reduce a time of the processing for adding an attribute name performed in each node at the time of adding a new attribute name.

The Second Exemplary Embodiment

Figure 25:
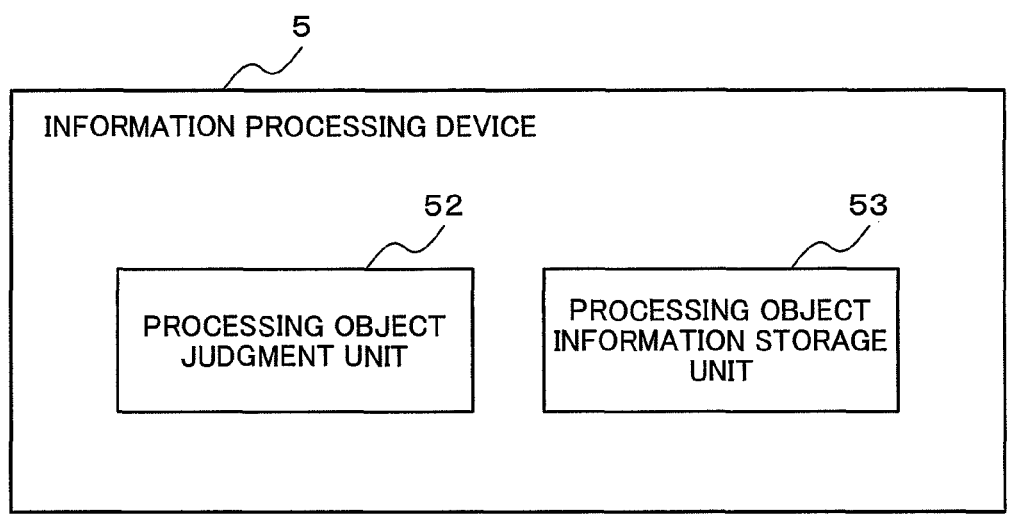
FIG. 25 is a diagram showing an exemplary configuration of an information processing device 5 in a second exemplary embodiment of the present invention.

Next, the second exemplary embodiment of the present invention will be described using FIG. 25. The information processing device 5 in this exemplary embodiment includes the processing object judgment unit 52 and the processing object information storage unit 53. Description about a structure and a operation of them will be omitted because these have been already mentioned above.

According to this information processing device 5, there is provided an information processing device which comprises its own-segment memorizing means for memorizing its own segment, the own segment being at least one segment among each segment made by dividing a range of a key into a plurality of segments so as to make the segments neighbor with each other, the key being generated about at least two attribute names using an attribute name and an attribute value based on a specified order relation and being of a size-comparable form; and a judgment means for judging whether a key generated from an attribute name and an attribute value being included in the own-segment or not.

According to this exemplary embodiment, an information processing device, a system, a control method and a program which reduce a time of processing for adding an attribute name performed in each node can be provided.

Meanwhile, the present invention is not limited to the above-mentioned exemplary embodiments, and it can be changed appropriately within a range that does not deviate from the purpose.

A node according to the present invention described above can be composed by supplying a storage medium storing a program which realizes the function of the above-mentioned exemplary embodiments to a device, and by a CPU (Central Processing Unit), a MPU (Micro Processing Unit) or the like provided in the device executing the program.

This program can be stored in various kinds of storage media, and can be transmitted via a communication media. Here, a storage medium includes a flexible disc, a hard disk, a magnetic disk, a magneto-laser disk, CD-ROM (Compact Disc Read Only Memory), DVD (Digital Versatile Disc), BD (Blu-ray (registered trademark) Disc), ROM (Read Only Memory) cartridge, RAM (Random Access Memory) with a battery backup, a memory cartridge, a flash memory cartridge and a non-volatile RAM cartridge, for example. Communication media include a wire communications medium such as a phone line and a wireless communication medium such as a microwave network. The above-mentioned program can be transmitted via the internet.

Not only a case where the function of the above-mentioned exemplary embodiments is realized by CPU or an MPU executing a program which realizes the function of the above-mentioned exemplary embodiments but also a case where the function of the above-mentioned exemplary embodiments is realized based on directions of this program in a manner cooperating with an OS (Operating System) or an application software operating on the device are included in an exemplary embodiment of the invention.

Further, when the function of the above-mentioned exemplary embodiment is realized by a function expansion board inserted in a device or a function expansion unit connected to a computer performing all or a part of the processing of this program is also included in an exemplary embodiment of the invention.

(Other Expressions of Supplementary Notes)

A part or all of the above-mentioned exemplary embodiments and examples can be also expressed as follows, but not limited to them.

(Supplementary Note 1)

An information processing device comprising: its own-segment memorizing means for memorizing its own segment, the own segment being at least one segment among each segment made by dividing a range of a key into a plurality of segments so as to make the segments neighbor with each other, the key being generated about at least two attribute names using an attribute name and an attribute value based on a specified order relation, and being of a size-comparable form; and a judgment means for judging whether a key generated from an attribute name and an attribute value being included in the own-segment or not.

The information processing device according to supplementary note 1, further comprising: a reception means for receiving event information, the event information including an attribute name and an attribute value; a segment information transfer means for, upon an attribute name having a frequency included in the received event information, being no smaller than a specified value existing among the attribute names, transmitting an end segment to another information processing device storing a segment neighboring the end segment, the end segment being a divided segment of the own segment and being a segment including a lower limit or an upper limit; a segment information receiving means for receiving a segment neighboring its own segment from another information processing device; and a processing object information storage means for updating its own-segment memorizing means using one of or both of the transmitted end segment and a segment received by the segment information receiving means.

(Supplementary Note 3)

The information processing device according to supplementary note 2, further comprising: a key information generation means for generating a key being of a size-comparable form based on an attribute name and an attribute value included in the event information, upon receiving the event information; an information transfer means for making the event information be the first processing object upon the generated key being included in the own segment, and transmitting the event information and the key generated from the event information to another information processing device upon being not included; the information transfer means, upon receiving the end segment from another information processing device, and the upper limit or the lower limit not meeting the upper limit or the lower limit of the own segment, transmitting the end segment to another information processing device, upon a lower limit or an upper limit of the received segment meeting the upper limit or the lower limit of the own segment, the processing object information storage means making the own-segment memorizing means store a segment made by adding the end segment to the own segment.

(Supplementary Note 4)

The information processing device according to any one of supplementary note 3, wherein, upon receiving subscription information, the subscription information being information including the attribute name and a range of a value permissible for the attribute value to take, the key information generation means generates a register key from: any one of attribute names of the attribute name and the attribute value, and an attribute value corresponding to the one attribute name, wherein, upon the register key being included in the own segment, the processing object information storage means holds a key range generated from the attribute name and a range of a value permissible for the attribute value to take included in the subscription information as an event condition, and wherein, upon the key being included in the own segment, the processing object judgment means carries out the first processing for searching for the event condition, and, upon the key being included in the event condition, makes the event information be a second processing object.

(Supplementary Note 5)

The information processing device according to any one of supplementary notes 3-4, wherein, upon existence of an attribute name having a frequency included in the received event information or the received subscription information being no smaller than a specified value among the attribute names, the information transfer means divides the own segment into three segments, and transmits, among the divided segments, a first segment including a lower limit and a second segment including an upper limit to another information processing device, and wherein the processing object information storage means assigns a segment to which the information transfer means is not transmitting to its own-device.

(Supplementary Note 6)

The information processing device according to any one of supplementary notes 3-4, wherein upon existence of an attribute name having a frequency included in the received event information or the received subscription information being no smaller than a specified value among the attribute names, the information transfer means divides the own segment into two segments, and transmits, between the divided segments, a segment including an upper limit or a lower limit to another information processing device, and wherein the processing object information storage means assigns other segment having not been transmitted by the information transfer means to its own-device.

(Supplementary Note 7)

The information processing device according to any one of supplementary notes 1 to 6, wherein the attribute name is expressed in a character string of an optional length.

(Supplementary Note 8)

The information processing device according to any one of supplementary notes 1 to 7, wherein the own-segment memorizing means stores an upper limit and a lower limit of its own segment, and, upon an order relation between an attribute name used for generation of an upper limit of the own segment and an attribute name used for generation of a lower limit of the own segment being not equal to the specified order relation, the judgment means judges that the generated key is included in its own segment if the generated key is small compared with the lower limit or large compared with the upper limit.

(Supplementary Note 9)

An information processing device, comprising: a processing object judgment means, connected with other information processing devices having each assigned segment other than a segment assigned to its own-device (own segment) among each segment made by dividing a range of a value of a key being a size-comparable form generated based on an attribute name and an attribute value into a plurality of segments, for making, upon receiving event information, the event information being information including the attribute name and the attribute value, and if the key generated from the attribute name and the attribute value included in the event information being included in the own segment, the event information be a first processing object; a information transfer means for dividing the own segment into no smaller than two segments, upon existence of an attribute name having a frequency included in the received event information, being no smaller than a specified value among the attribute names, and transmitting a segment including an upper limit or a lower limit (end segment) among the divided segments to another information processing device which assigns its own device a segment in that the end segment is added to the segment when receiving the end segment, and which is assigned by a segment neighboring the end segment; a processing object information storage means for assigning at least one segment other than an end segment having been transmitted by the information transfer means to its own-device.

(Supplementary Note 10)

An information processing program for making an information processing device comprising its own-segment memorizing means for memorizing its own segment, the own segment being at least one segment among each segment made by dividing a range of a key into a plurality of segments so as to make the segments neighbor with each other, the key being generated about at least two attribute names using an attribute name and an attribute value based on a specified order relation and being of a size-comparable form, carry out a judgment step of determining whether a key generated from an attribute name and an attribute value being included in the own segment or not.

(Supplementary Note 11)

The information processing program according to supplementary note 10, further making an information processing device carry out: a reception step of receiving event information, the event information including an attribute name and an attribute value; a segment information transfer step of, upon an attribute name having a frequency included in the received event information being no smaller than a specified value existing among the attribute names, transmitting an end segment to another information processing device storing a segment neighboring the end segment, the end segment being a divided segment of the own segment and being a segment including a lower limit or an upper limit; a segment information receiving step of receiving a segment neighboring its own segment from another information processing device; and a processing object information storage step of updating the own-segment memorizing means using one of or both of the transmitted end segment and a segment received by the segment information receiving step.

(Supplementary Note 12)

The information processing program according to supplementary note 11 for making an information processing device carry out: a key information generation step of generating a key of a size-comparable form based on an attribute name and an attribute value included in the event information, upon receiving the event information; an information transfer step of making the event information be the first processing object upon the generated key being included in the own segment, and transmitting the event information and the key generated from the event information to another information processing device upon being not included; in the information transfer step, upon receiving the end segment from another information processing device and the upper limit or the lower limit not meeting the upper limit or the lower limit of the own segment, transmitting the end segment to another information processing device; and in the processing object information storage step, upon a lower limit or an upper limit of the received segment meeting the upper limit or the lower limit of the own segment, making the own-segment memorizing means store a segment made by adding the end segment to the own segment.

(Supplementary Note 13)

The information processing program according to supplementary note 12, wherein, upon receiving subscription information, the subscription information being information including the attribute name and a range of a value permissible for the attribute value to take, in the key information generation step, a register key is generated from: any one attribute name of the attribute name and the attribute value, and an attribute value corresponding to the one attribute name, wherein, upon the register key being included in the own segment, in the processing object information storage step, a key range generated from the attribute name and a range of a value permissible for the attribute value to take included in the subscription information is held as an event condition, and wherein, upon the key being included in the own segment, in the processing object judgment step, the first processing for searching for the event condition is carried out, and, upon the key being included in the event condition, the event information is made to be a second processing object.

(Supplementary Note 14)

The information processing program according to any one of supplementary notes 12-13, wherein, upon existence of an attribute name having a frequency included in the received event information or the received subscription information, being no smaller than a specified value among the attribute names, in the information transfer step, the own segment is divided into three segments, and a first segment including a lower limit and a second segment including an upper limit among the divided segments are transmitted to other information processing devices, and wherein, in the processing object information storage step, a segment having not been transmitted by the information transfer means is assigned to its own-device.

(Supplementary Note 15)

The information processing program according to any one of supplementary notes 12-13, wherein, upon existence of an attribute name having a frequency included in the received event information or the received subscription information, being no smaller than a specified value among the attribute names, in the information transfer step, the own segment is divided into two segments, and a segment including an upper limit or a lower limit between the divided segments is transmitted to another information processing device, and wherein, in the processing object information storage step, a segment having not been transmitted by the information transfer means is assigned to its own-device.

(Supplementary Note 16)

The information processing program according to any one of supplementary notes 10-15, wherein the own-segment memorizing means stores an upper limit and a lower limit of its own segment, and, upon an order relation between an attribute name used for generation of an upper limit of the own segment and an attribute name used for generation of a lower limit of the own segment being not equal to the specified order relation, in the judgment step, judging that the generated key is included in its own segment if the generated key is smaller than the lower limit or larger than the upper limit.

(Supplementary Note 17)

An information processing program for making a computer connected with other information processing devices in which each segment other than a segment assigned to its own-device (own segment) among each segment made by dividing a range of a value of a key being a size-comparable form generated based on an attribute name and an attribute value into a plurality of segments being assigned, carry out: a processing object judgment step of making, upon receiving event information, the event information being information including the attribute name and the attribute value, and if the key generated from the attribute name and the attribute value included in the event information being included in the own segment, the event information be a first processing object; an information transfer step of, upon an attribute name having a frequency included in the received event information, being no smaller than a specified value existing among the attribute names, dividing the own segment into no smaller than two segments, and transmitting a segment including an upper limit or a lower limit (end segment) among the divided segments to another information processing device in which a segment neighboring the end segment is assigned, and assigns a segment made by adding the end segment to the assigned segment to its own-device, upon the end segment being received; a processing object information storage step of assigning at least one segment other than an end segment having been transmitted in the information transfer means to its own-device.

(Supplementary Note 18)

An information processing method, comprising: carrying out judgment for judging whether a key generated from an attribute name and an attribute value being included in its own segment or not by an information processing device, the information processing device comprising its own-segment memorizing means for memorizing the own segment, the own segment being at least one segment among each segment made by dividing a range of a key into a plurality of segments so as to make the segments neighbor with each other, the key being generated about at least two attribute names using an attribute name and an attribute value based on a specified order relation and being of a size-comparable form.

(Supplementary Note 19)

The data processing method according to supplementary note 18, further comprising: receiving event information, the event information including an attribute name and an attribute value; upon an attribute name having a frequency included in the received event information being no smaller than a specified value existing among the attribute names, transmitting an end segment to another information processing device storing a segment neighboring the end segment, the end segment being a divided segment of the own segment or being a segment including a lower limit and an upper limit; receiving a segment neighboring its own segment from another information processing device; and updating its own-segment memorizing means using one of or both of the transmitted end segment.

(Supplementary Note 20)

The data processing method according to supplementary note 19, comprising: generating a key of a size-comparable form based on an attribute name and an attribute value included in the event information, upon receiving the event information; making the event information be the first processing object, upon the generated key being included in the own segment, and transmitting the event information and the key generated from the event information to another information processing device, upon being not included; upon receiving the end segment from another information processing device, and the upper limit or the lower limit not meeting the upper limit or the lower limit of the own segment, transmitting the end segment to another information processing device; and upon a lower limit or an upper limit of the received segment meeting the upper limit or the lower limit of the own segment, storing a segment made by adding the end segment to the own segment.

(Supplementary Note 21)

The data processing program according to supplementary note 20, comprising: upon receiving subscription information, the subscription information being information including the attribute name and a range of a value permissible for the attribute value to take, generating a register key from: any one attribute name of the attribute name and the attribute value, and an attribute value corresponding to the one attribute name; upon the register key being included in the own segment, holding a key range generated from the attribute name and a range of a value permissible for the attribute value included in the subscription information as an event condition, and, upon the key being included in the own segment, carrying out the first processing for searching for the event condition, and, upon the key being included in the event condition, making the event information be a second processing object.

(Supplementary Note 22)

The data processing method according to any one of supplementary notes 20-21, comprising: upon existence of an attribute name having a frequency included in the received event information or the received subscription information being no smaller than a specified value among the attribute names, dividing the own segment into three segments, and transmitting, among the divided segments, a first segment including a lower limit and a second segment including an upper limit to other information processing devices, and assigning a segment having not been transmitted to its own-device.

(Supplementary Note 23)

The information processing method according to any one of supplementary notes 20-21, comprising: upon existence of an attribute name having a frequency included in the received event information or the received subscription information being no smaller than a specified value among the attribute names, dividing the own segment into two segments and transmitting a segment including an upper limit or a lower limit between the divided segments to another information processing device; and assigning a segment having not been transmitted to its own-device.

(Supplementary Note 24)

The data processing method according to any one of supplementary notes 18-23, wherein the own-segment memorizing means storing an upper limit and a lower limit of its own segment; and, upon an order relation between an attribute name used for generation of an upper limit of the own segment and an attribute name used for generation of a lower limit of the own segment being not equal to the specified order relation, judging that the generated key is included in its own segment if the generated key is smaller than the lower limit or larger than the upper limit.

(Supplementary Note 25)

A control method of an information processing device, wherein an information processing device connected with other information processing devices in which each segment other than a segment assigned to its own-device (own segment) among each segment made by dividing a range of a value of a key of a size-comparable form generated based on an attribute name and an attribute value into a plurality of segments being assigned, makes, upon receiving event information, the event information being information including the attribute name and the attribute value, and if the key generated from the attribute name and the attribute value included in the event information being included in the own segment, the event information be a first processing object; upon an attribute name having a frequency included in the received event information, being no smaller than a specified value existing among the attribute names, divides the own segment into no smaller than two segments, and transmits a segment including an upper limit or a lower limit (end segment) among the divided segments to another information processing device in which a segment neighboring the end segment is assigned and assigns a segment made by adding the end segment to the assigned segment to its own-device, upon the end segment being received; and assigns at least one segment other than an end segment having been transmitted by the information transfer means to its own-device.

(Supplementary Note 26)

An information processing system made by connecting: an information processing device according to any one of supplementary notes 1-9; and another information processing devices in which each segment other than a segment assigned to the own-device is assigned.

Although the present invention has been described with reference to an exemplary embodiment, the present invention is not limited to the above-mentioned exemplary embodiments. Various modifications which a person skilled in the art can understand within the scope of the present invention can be made in the composition and details of the present invention.

This application claims priority based on Japanese application Japanese Patent Application No. 2010-245766, filed on Nov. 2, 2010, the disclosure of which is incorporated herein in its entirety.

REFERENCE SIGNS LIST

5 Information processing device
11 Subscription transfer information generating unit
12 Event transfer information generating unit
13 Message judgment unit
14 Subscription arrangement control unit
15 Subscription management unit
16 Event condition accordance judgment unit
17 Message transfer unit
51 Key information generating unit
52 Processing object judgment unit
53 Processing object information storage unit
54 Information transfer unit

What is claimed is:

1. An information processing comprising:
a CPU; and
a memory; wherein
said CPU carries out processing which comprises:
an its own-segment memorizing unit that memorizes its own segment, the own segment being at least on segment among each segment made by dividing a range of a key into a plurality of segments so as to make the segments neighbor with each other, the key being generated about at least two attribute names using an attribute name and an attribute value, based on a predetermined order relation and being of a size-comparable form; and
a judgment unit that judges whether a key generated from an attribute name and an attribute value being included in the own-segment or not;
a reception unit that receives event information, the event information including an attribute name and an attribute value;
a segment information transfer unit that, when an attribute name having a frequency included in the received event information being no smaller than a predetermined value is existing among the attribute names, transmits an end segment to another information processing device storing a segment neighboring the end segment, the end segment being a divided segment of the own segment and being a segment including a lower limit or an upper limit;
a segment information receiving unit that receives a segment neighboring its own segment from another information processing device; and
a processing object information storage unit that updates its own-segment memorizing unit using one of or both of the transmitted end segment and a segment received by the segment information receiving unit.

2. The information processing device according to claim 1, further comprising:
a key information generation unit that generates a key of a size-comparable form based on an attribute name and an attribute value included in the event information, upon receiving the event information;
an information transfer unit that makes the event information be the first processing object, upon the generated key being included in the own segment, and transmits the event information and the key generated from the event information to another information processing device, upon being not included;
the information transfer unit,
upon receiving the end segment from another information processing device and the upper limit or the lower limit not meeting the upper limit or the lower limit of the own segment, that transmits the end segment to another information processing device; and
the processing object information storage unit,
upon a lower limit or an upper limit of the received segment meeting the upper limit or the lower limit of the own segment, that makes the own-segment memorizing unit store a segment made by adding the end segment to the own segment.

3. The information processing device according to claim 2, wherein,
upon receiving subscription information, the subscription information being information including the attribute name and a range of a value permissible for the attribute value to take, the key information generation unit generates a register key from: any one attribute name of the attribute name and the attribute value, and an attribute value corresponding to the one attribute name, wherein,
upon the register key being included in the own segment, the processing object information storage unit holds a key range generated from the attribute name and a range of a value permissible for the attribute value to take included in the subscription information as an event condition, and wherein, upon the key being included in the own segment, the processing object judgment unit carries out the first processing for searching for the event condition, and upon the key being included in the event condition, makes the event information be a second processing object.

4. The information processing device according to claim 3, wherein, upon existence of an attribute name having a frequency included in the received event information or the received subscription information, being no smaller than a predetermined value among the attribute names, the information transfer unit divides the own segment into three segments, and transmits, among the divided segments, a first segment including a lower limit and a second segment including an upper limit to another information processing devices, and wherein the processing object information storage unit assigns a segment having not been transmitted by the information transfer means to its own-device.

5. The information processing device according to claim 1, wherein the attribute name is expressed in a character string of an optional length.

6. The information processing device according to claim 1, wherein the own-segment memorizing unit stores an upper limit and a lower limit of its own segment, and upon an order relation between an attribute name used for generation of an upper limit of the own segment and an attribute name used for generation of a lower limit of the own segment being not equal to the predetermined order relation, the judgment unit judges that the generated key is included in its own segment if the generated key is small compared with the lower limit or large compared with the upper limit.

7. An information processing comprising:

a plurality of information processing devices according to claim 1;

wherein said information processing devices are assigned keys generated from an attribute name.

8. A non-transitory computer-readable medium for storing an information processing program for causing an information processing device which comprises its own-segment memorizing unit that memorizes its own segment, the own segment being at least one segment among each segment made by dividing a range of a key into a plurality of segments so as to make the segments neighbor with each other, the key being generated about at least two attribute names using an attribute name and an attribute value based on a predetermined order relation and being of a size-comparable form, to carry out a judgment process of determining whether a key generated from an attribute name and an attribute value being included in the own segment or not to receive event information, the event information including an attribute name and an attribute value;

to, when an attribute name having a frequency included in the received event information being no smaller than a predetermined value is existing among the attribute names, transmit an end segment to another information processing device storing a segment neighboring the end segment, the end segment being a divided segment of the own segment and being a segment including a lower limit or an upper limit;

to receive a segment neighboring its own segment from another information processing device; and to update its own-segment memorizing unit using one of or both of the transmitted end segment and a segment that has been received.

9. A data processing method comprising:

carrying out judgment for judging whether a key generated from an attribute name and an attribute value being included in its own segment or not by an information processing device, the information processing device comprising its own-segment memorizing unit that memorizes the own segment, the own segment being at least one segment among each segment made by dividing a range of a key into a plurality of segments so as to make the segments neighbor with each other, the key being generated about at least two attribute names using an attribute name and an attribute value based on a predetermined order relation and being of a size-comparable form, receiving event information, the event information including an attribute name and an attribute value;

when an attribute name having a frequency included in the received event information being no smaller than a predetermined value is existing among the attribute names, transmitting an end segment to another information processing device storing a segment neighboring the end segment, the end segment being a divided segment of the own segment and being a segment including a lower limit or an upper limit;

receiving a segment neighboring its own segment from another information processing device; and updating its own-segment memorizing unit using one of or both of the transmitted end segment and a segment that has been received.

* * * * *